US012597238B2

(12) United States Patent
Dong et al.

(10) Patent No.: US 12,597,238 B2
(45) Date of Patent: Apr. 7, 2026

(54) AUTOMATIC IMAGE VARIETY SIMULATION FOR IMPROVED DEEP LEARNING PERFORMANCE

(71) Applicant: GE Precision Healthcare LLC, Waukesha, WI (US)

(72) Inventors: Xiaomeng Dong, San Ramon, CA (US); Michael Potter, Concord, CA (US); Hongxu Yang, Utrecht (NL); Junpyo Hong, San Ramon, CA (US); Ravi Soni, Livermore, CA (US); Gopal Biligeri Avinash, Concord, CA (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 426 days.

(21) Appl. No.: 18/356,461

(22) Filed: Jul. 21, 2023

(65) Prior Publication Data

US 2025/0029370 A1      Jan. 23, 2025

(51) Int. Cl.
*G06V 10/774* (2022.01)
*G06V 10/776* (2022.01)
*G06V 10/82* (2022.01)

(52) U.S. Cl.
CPC .......... *G06V 10/774* (2022.01); *G06V 10/776* (2022.01); *G06V 10/82* (2022.01); *G06V 2201/03* (2022.01)

(58) Field of Classification Search
CPC .... G06V 10/774; G06V 10/776; G06V 10/82; G06V 2201/00
See application file for complete search history.

(56) References Cited

U.S. PATENT DOCUMENTS

| | | | | |
|---|---|---|---|---|
| 12,431,237 | B2 * | 9/2025 | Aladahalli | G06V 10/54 |
| 2018/0373999 | A1 * | 12/2018 | Xu | G06N 3/09 |
| 2019/0080475 | A1 * | 3/2019 | Ma | G06N 3/08 |
| 2020/0219274 | A1 * | 7/2020 | Afridi | G06N 3/04 |
| 2020/0242736 | A1 * | 7/2020 | Liu | G06T 11/60 |

(Continued)

OTHER PUBLICATIONS

Wikipedia | "Gram matrix." https://en.wikipedia.org/wiki/Gram_matrix, last accessed Jul. 6, 2023, 5 pages.

(Continued)

*Primary Examiner* — Ross Varndell
(74) *Attorney, Agent, or Firm* — Amin, Turocy & Watson, LLP

(57) ABSTRACT

In various embodiments, a system can: access a failure image on which a first model has inaccurately performed an inferencing task; train, on a set of dummy images, a second model to learn a visual variety of the failure image, based on a loss function having a first term and a second term, the first term quantifying visual content dissimilarities between the set of dummy images and outputs predicted during training by the second model, and the second term quantifying, at a plurality of different image scales, visual variety dissimilarities between the failure image and the outputs predicted during training by the second model; and execute the second model on each of a set of training images on which the first model was trained, thereby yielding a set of first converted training images that exhibit the visual variety of the failure image.

20 Claims, 24 Drawing Sheets

(56) References Cited

U.S. PATENT DOCUMENTS

2022/0222873 A1*  7/2022  Shreshtha .............. A61B 34/10
2023/0004760 A1*  1/2023  Mustikovela .......... G06V 20/56

OTHER PUBLICATIONS

Sossin, A. et al. | "Fast scattering simulation tool for multi-energy x-ray imaging." (2015) Nuclear Instruments and Methods in Physics Research A, 802, 60-66, available on-line Sep. 9, 2015, 7 pages.

Abadi, Eh. et al. | "DukeSim: A Realistic, Rapid, and Scanner-Specific Simulation Framework in Computed Tomography." IEEE Trans Med Imaging. Jun. 2019; 38(6): 1457-1465, doi: 10.1109/TMI.2018.2886530, 22 pages.

Xantis, Ch. et al. | "A high performance parallelizable MRI physics simulator with graphic processing unit technology." J Cardiovasc Magn Reson 15 (Suppl 1), E45 (2013), https://doi.org/10.1186/1532-429X-15-S1-E45, 2 pages.

Johnson, J. et al. | "Perceptual Losses for Real-Time Style Transfer and Super-Resolution." In Computer Vision—ECCV 2016—14th European Conference, Amsterdam, The Netherlands, Oct. 11-14, 2016, Proceedings, Part II (pp. 694-711), 17 pages.

Zhu, J.Y. et al. | "Unpaired Image-to-Image Translation Using Cycle-Consistent Adversarial Networks." In IEEE International Conference on Computer Vision, ICCV 2017, Venice, Italy, Oct. 22-29, 2017, 10 pages.

* cited by examiner

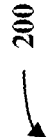
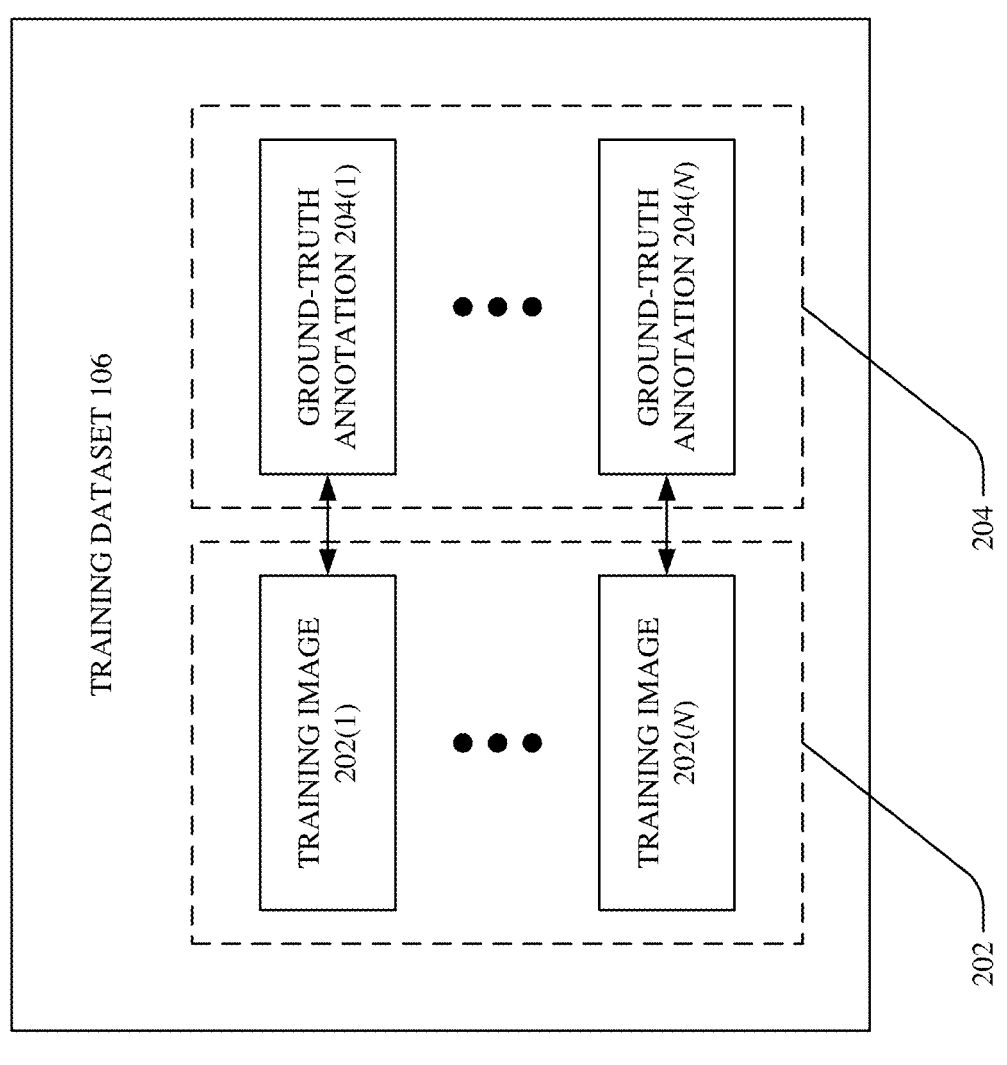
FIG. 2

Figure 5:
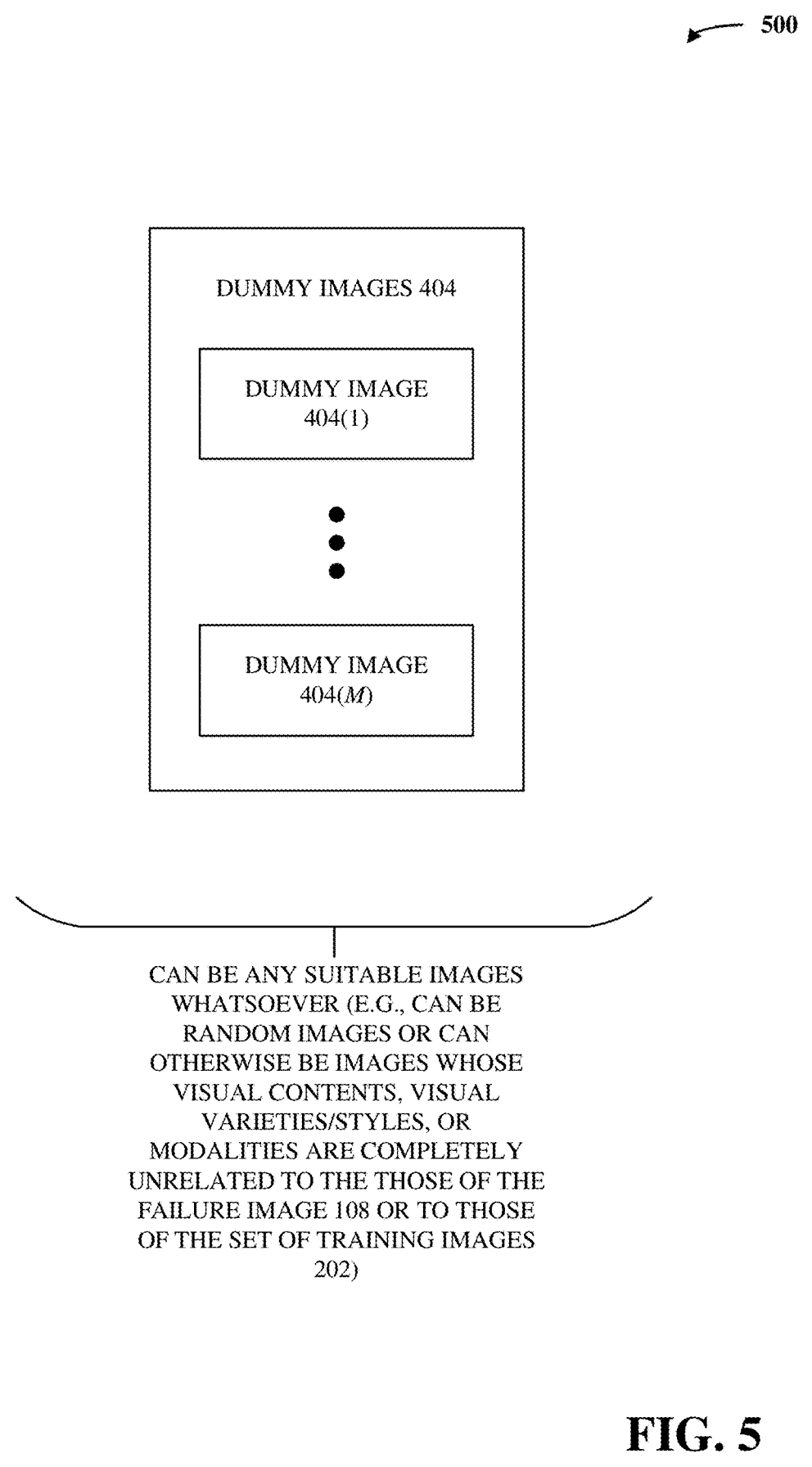

500

DUMMY IMAGES 404

DUMMY IMAGE
404(1)

•
•
•

DUMMY IMAGE
404(*M*)

CAN BE ANY SUITABLE IMAGES
WHATSOEVER (E.G., CAN BE
RANDOM IMAGES OR CAN
OTHERWISE BE IMAGES WHOSE
VISUAL CONTENTS, VISUAL
VARIETIES/STYLES, OR
MODALITIES ARE COMPLETELY
UNRELATED TO THE THOSE OF THE
FAILURE IMAGE 108 OR TO THOSE
OF THE SET OF TRAINING IMAGES
202)

IMAGE SCALE DEFINED BY A SINGLE, GLOBAL REGION $R_{1,1}$

COMPUTE ONE GRAM MATRIX DIFFERENCE

IMAGE SCALE
DEFINED BY FOUR
GRANULAR REGIONS

| $R_{2,1}$ | $R_{2,2}$ |
| $R_{2,3}$ | $R_{2,4}$ |

COMPUTE FOUR
GRAM MATRIX
DIFFERENCES

IMAGE SCALE
DEFINED BY SIXTEEN
MORE GRANULAR
REGIONS

| $R_{3,1}$ | $R_{3,2}$ | $R_{3,3}$ | $R_{3,4}$ |
|---|---|---|---|
| $R_{3,5}$ | $R_{3,6}$ | $R_{3,7}$ | $R_{3,8}$ |
| $R_{3,9}$ | $R_{3,10}$ | $R_{3,11}$ | $R_{3,12}$ |
| $R_{3,13}$ | $R_{3,14}$ | $R_{3,15}$ | $R_{3,16}$ |

COMPUTE SIXTEEN
GRAM MATRIX
DIFFERENCES

1404
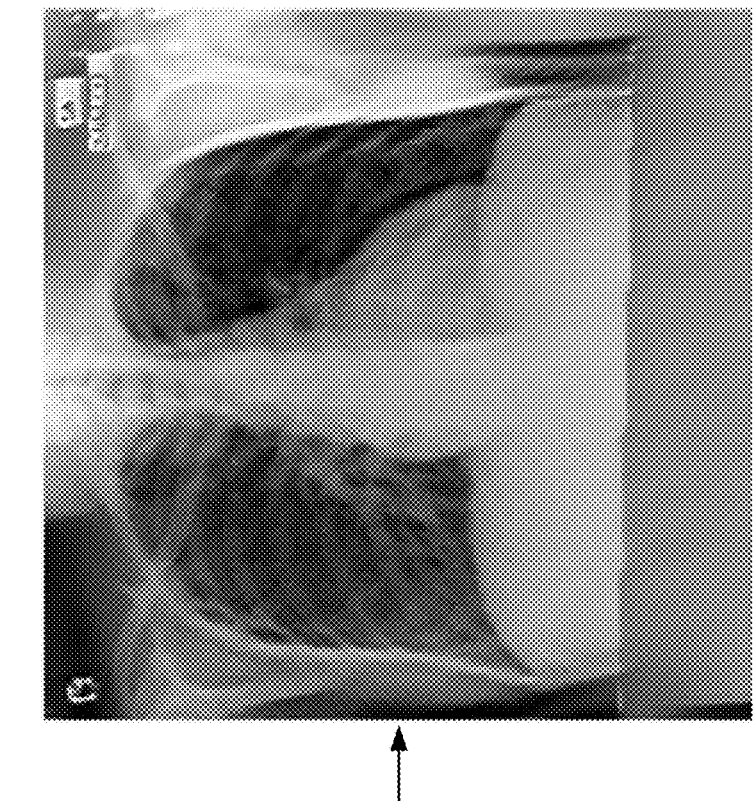
1402
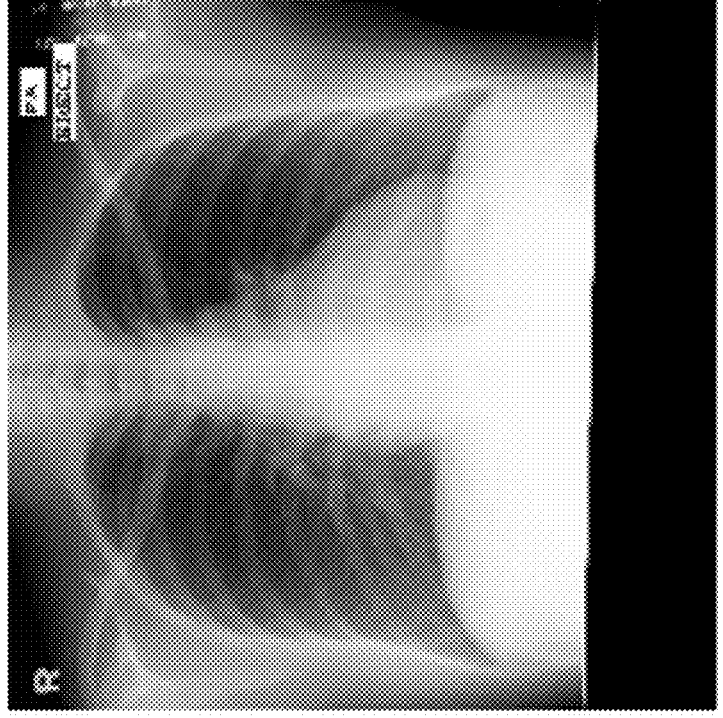
FIG. 14

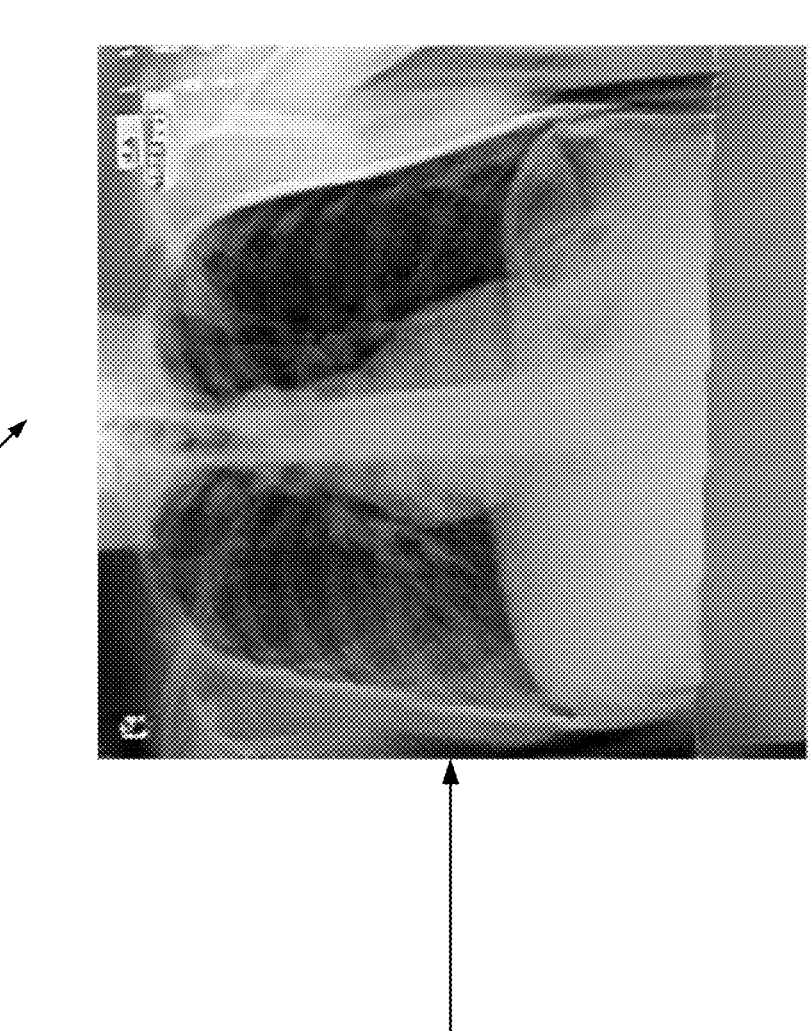
1504
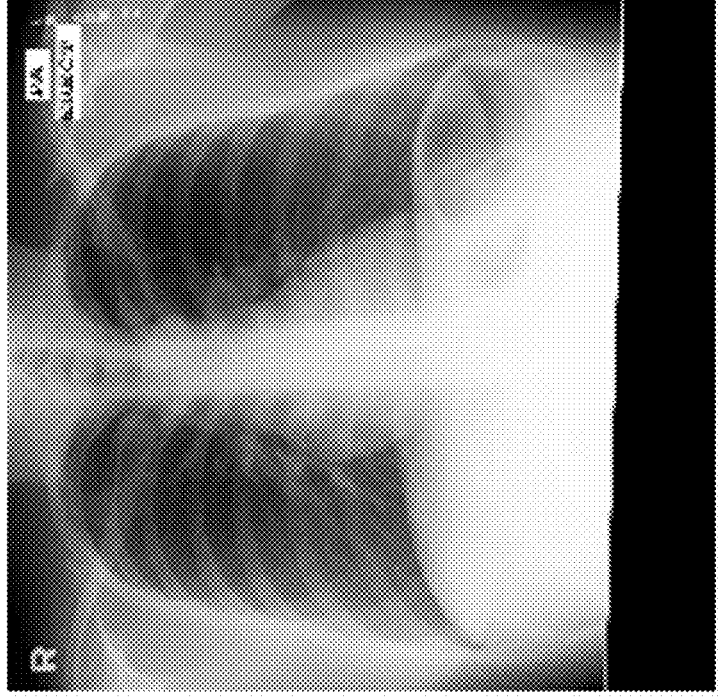
1502
FIG. 15

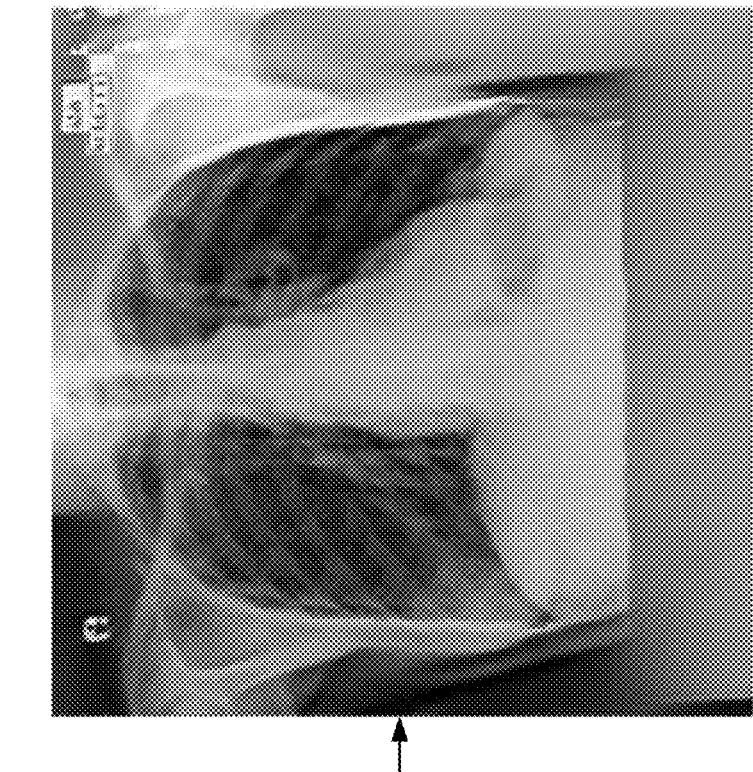
1604
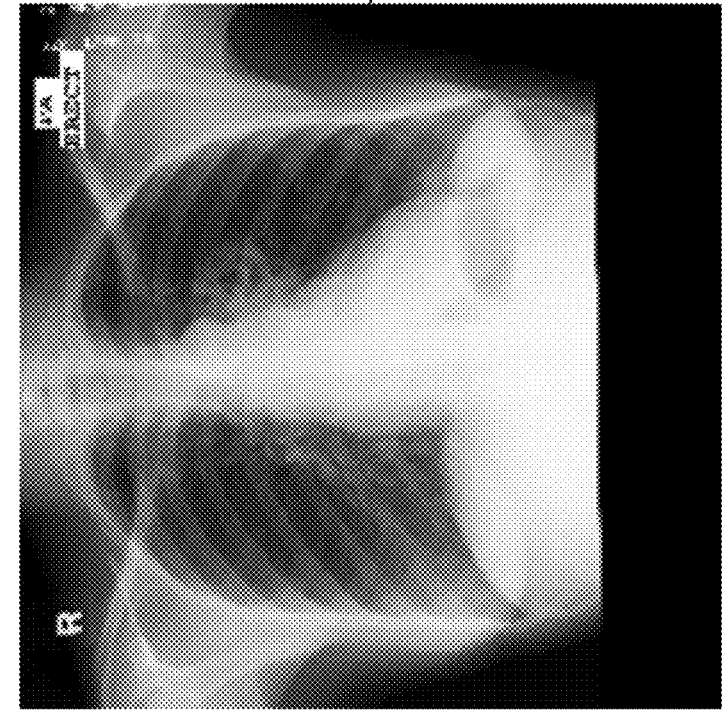
1602
FIG. 16

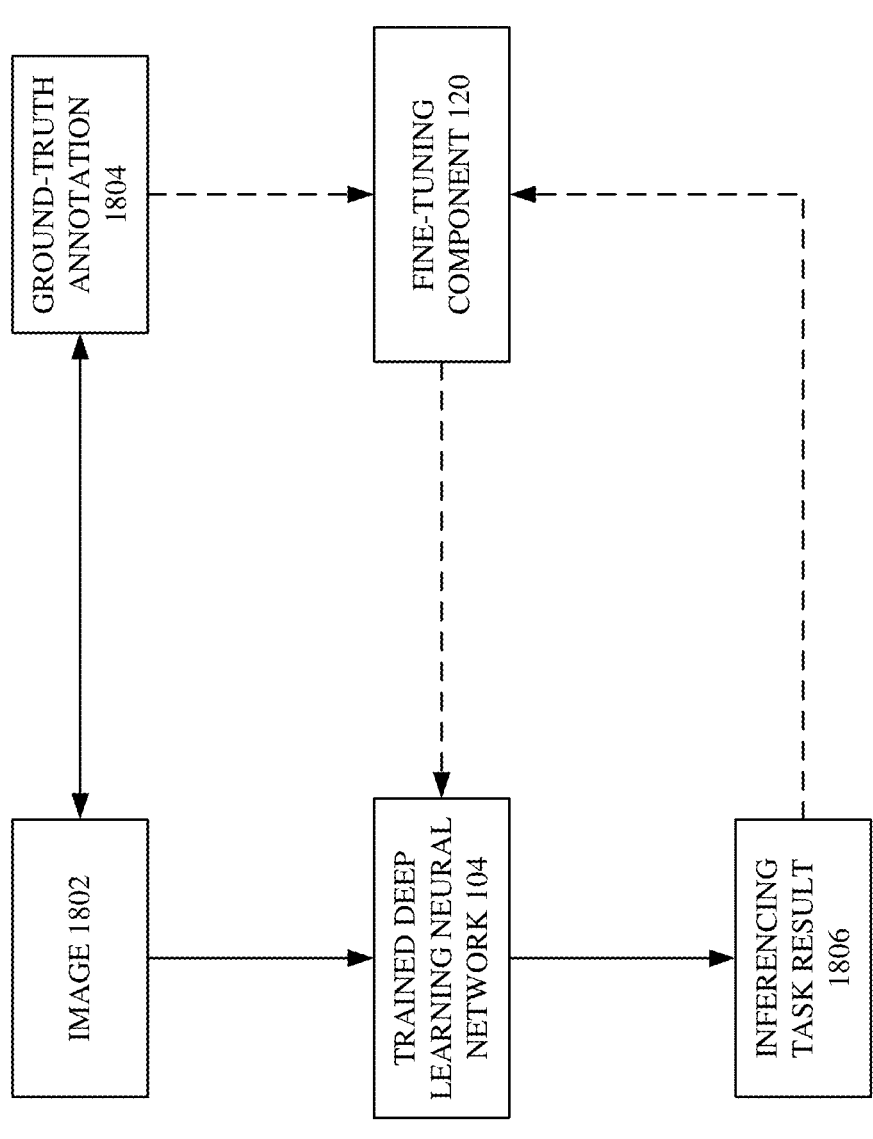
FIG. 18

2100

| DICE SCORE RANGE | ORIGINAL TRAINING DATASET | ORIGINAL TRAINING DATASET, PLUS FAILURE IMAGE | ORIGINAL TRAINING DATASET, PLUS CONVERTED TRAINING DATASET EXHIBITING LEARNED VARIETY OF FAILURE IMAGE |
|---|---|---|---|
| [0 , 0.1) | 1 | 2 | 0 |
| [0.1 , 0.2) | 0 | 1 | 0 |
| [0.2 , 0.3) | 1 | 1 | 0 |
| [0.3 , 0.4) | 5 | 12 | 0 |
| [0.4 , 0.5) | 12 | 31 | 3 |
| [0.5 , 0.6) | 48 | 61 | 6 |
| [0.6 , 0.7) | 130 | 134 | 23 |
| [0.7 , 0.8) | 482 | 441 | 115 |
| [0.8 , 0.9) | 1495 | 1401 | 771 |
| [0.9 , 1.0) | 2782 | 2872 | 4038 |
| AVERAGE | 0.8852 | 0.8854 | 0.9293 |
| STANDARD DEVIATION | 0.0860 | 0.0954 | 0.0513 |
| 25TH PERCENTILE | 0.8509 | 0.8536 | 0.9153 |
| MEDIAN | 0.9118 | 0.9152 | 0.9454 |
| 75TH PERCENTILE | 0.9466 | 0.9502 | 0.9620 |

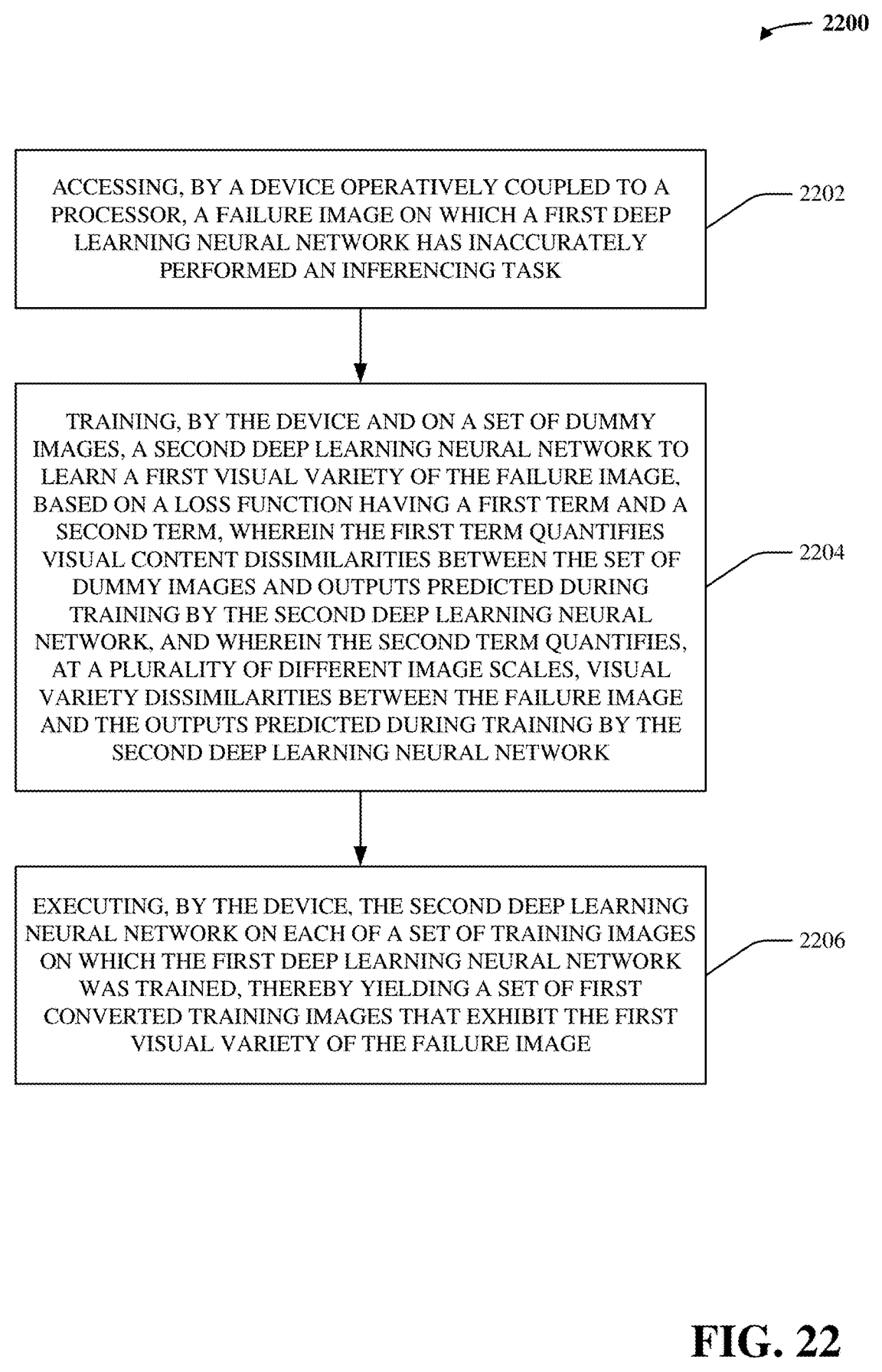

ACCESSING, BY A DEVICE OPERATIVELY COUPLED TO A PROCESSOR, A FAILURE IMAGE ON WHICH A FIRST DEEP LEARNING NEURAL NETWORK HAS INACCURATELY PERFORMED AN INFERENCING TASK     2202

TRAINING, BY THE DEVICE AND ON A SET OF DUMMY IMAGES, A SECOND DEEP LEARNING NEURAL NETWORK TO LEARN A FIRST VISUAL VARIETY OF THE FAILURE IMAGE, BASED ON A LOSS FUNCTION HAVING A FIRST TERM AND A SECOND TERM, WHEREIN THE FIRST TERM QUANTIFIES VISUAL CONTENT DISSIMILARITIES BETWEEN THE SET OF DUMMY IMAGES AND OUTPUTS PREDICTED DURING TRAINING BY THE SECOND DEEP LEARNING NEURAL NETWORK, AND WHEREIN THE SECOND TERM QUANTIFIES, AT A PLURALITY OF DIFFERENT IMAGE SCALES, VISUAL VARIETY DISSIMILARITIES BETWEEN THE FAILURE IMAGE AND THE OUTPUTS PREDICTED DURING TRAINING BY THE SECOND DEEP LEARNING NEURAL NETWORK     2204

EXECUTING, BY THE DEVICE, THE SECOND DEEP LEARNING NEURAL NETWORK ON EACH OF A SET OF TRAINING IMAGES ON WHICH THE FIRST DEEP LEARNING NEURAL NETWORK WAS TRAINED, THEREBY YIELDING A SET OF FIRST CONVERTED TRAINING IMAGES THAT EXHIBIT THE FIRST VISUAL VARIETY OF THE FAILURE IMAGE     2206

FIG. 22

AUTOMATIC IMAGE VARIETY SIMULATION FOR IMPROVED DEEP LEARNING PERFORMANCE

TECHNICAL FIELD

The subject disclosure relates generally to deep learning, and more specifically to automatic image variety simulation for improved deep learning performance.

BACKGROUND

A deep learning neural network can be trained to perform an inferencing task on inputted images. After being trained, the deep learning neural network can be deployed in the field, so as to perform the inferencing task on inputted images that lack ground-truth annotations. If the deep learning neural network is found to have inaccurately performed the inferencing task on images during deployment, retraining can be warranted so as to improve robustness of the deep learning neural network. To facilitate such retraining, it can be desirable to generate new images that are somehow substantively different from the images on which the deep learning neural network was trained. Unfortunately, existing techniques for such image generation are excessively expensive with respect to computational resources or training data acquisition.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate automatic image variety simulation for improved deep learning performance are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a failure image on which a first deep learning neural network has inaccurately performed an inferencing task. In various aspects, the computer-executable components can comprise a variety component that can train, on a set of dummy images, a second deep learning neural network to learn a first visual variety of the failure image, based on a loss function having a first term and a second term, wherein the first term can quantify visual content dissimilarities between the set of dummy images and outputs predicted during training by the second deep learning neural network, and wherein the second term can quantify, at a plurality of different image scales, visual variety dissimilarities between the failure image and the outputs predicted during training by the second deep learning neural network. In various instances, the computer-executable components can comprise a conversion component that can execute the second deep learning neural network on each of a set of training images on which the first deep learning neural network was trained, thereby yielding a set of first converted training images that exhibit the first visual variety of the failure image.

According to one or more embodiments, a computer-implemented method is provided. In various embodiments, the computer-implemented method can comprise accessing, by a device operatively coupled to a processor, a failure image on which a first deep learning neural network has inaccurately performed an inferencing task. In various aspects, the computer-implemented method can comprise training, by the device and on a set of dummy images, a second deep learning neural network to learn a first visual variety of the failure image, based on a loss function having a first term and a second term, wherein the first term can quantify visual content dissimilarities between the set of dummy images and outputs predicted during training by the second deep learning neural network, and wherein the second term can quantify, at a plurality of different image scales, visual variety dissimilarities between the failure image and the outputs predicted during training by the second deep learning neural network. In various instances, the computer-implemented method can comprise executing, by the device, the second deep learning neural network on each of a set of training images on which the first deep learning neural network was trained, thereby yielding a set of first converted training images that exhibit the first visual variety of the failure image.

According to one or more embodiments, a computer program product for facilitating automatic image variety simulation for improved deep learning performance is provided. In various embodiments, the computer program product can comprise a non-transitory computer-readable memory having program instructions embodied therewith. In various aspects, the program instructions can be executable by a processor to cause the processor to access a failure medical image on which a first deep learning neural network has generated an inaccurate inferencing task result. In various instances, the program instructions can be executable to cause the processor to train, on a set of non-medical images, a second deep learning neural network to learn a visual variety of the failure medical image, based on a loss function having a first term and a second term, wherein the first term can quantify visual content dissimilarities between the set of non-medical images and outputs predicted during training by the second deep learning neural network, and wherein the second term can quantify, at a plurality of different image scales, visual variety dissimilarities between the failure medical image and the outputs predicted during training by the second deep learning neural network. In various cases, the program instructions can be executable to cause the processor to execute the second deep learning neural network on each of a set of training medical images on which the first deep learning neural network was trained, thereby yielding a set of converted training medical images that exhibit the visual variety of the failure medical image.

DESCRIPTION OF THE DRAWINGS

FIG. 2 illustrates an example, non-limiting block diagram of a deep learning training dataset in accordance with one or more embodiments described herein.

FIG. 5 illustrates an example, non-limiting block diagram of a set of dummy images in accordance with one or more embodiments described herein.

FIGS. 6-11 illustrate example, non-limiting block diagrams showing how a variety deep learning neural network can be trained in accordance with one or more embodiments described herein.

FIGS. 14-16 illustrate non-limiting examples of how various embodiments described herein can be applied to real-world X-ray images.

FIG. 18 illustrates an example, non-limiting block diagram showing how variety-converted images produced by a variety deep learning neural network can be used to retrain another deep learning neural network in accordance with one or more embodiments described herein.

FIG. 21 illustrates an example, non-limiting table of experimental results in accordance with one or more embodiments described herein.

FIG. 22 illustrates a block diagram of an example, non-limiting computer-implemented method that facilitates automatic image variety simulation for improved deep learning performance in accordance with one or more embodiments described herein.

DETAILED DESCRIPTION

Figure 1:
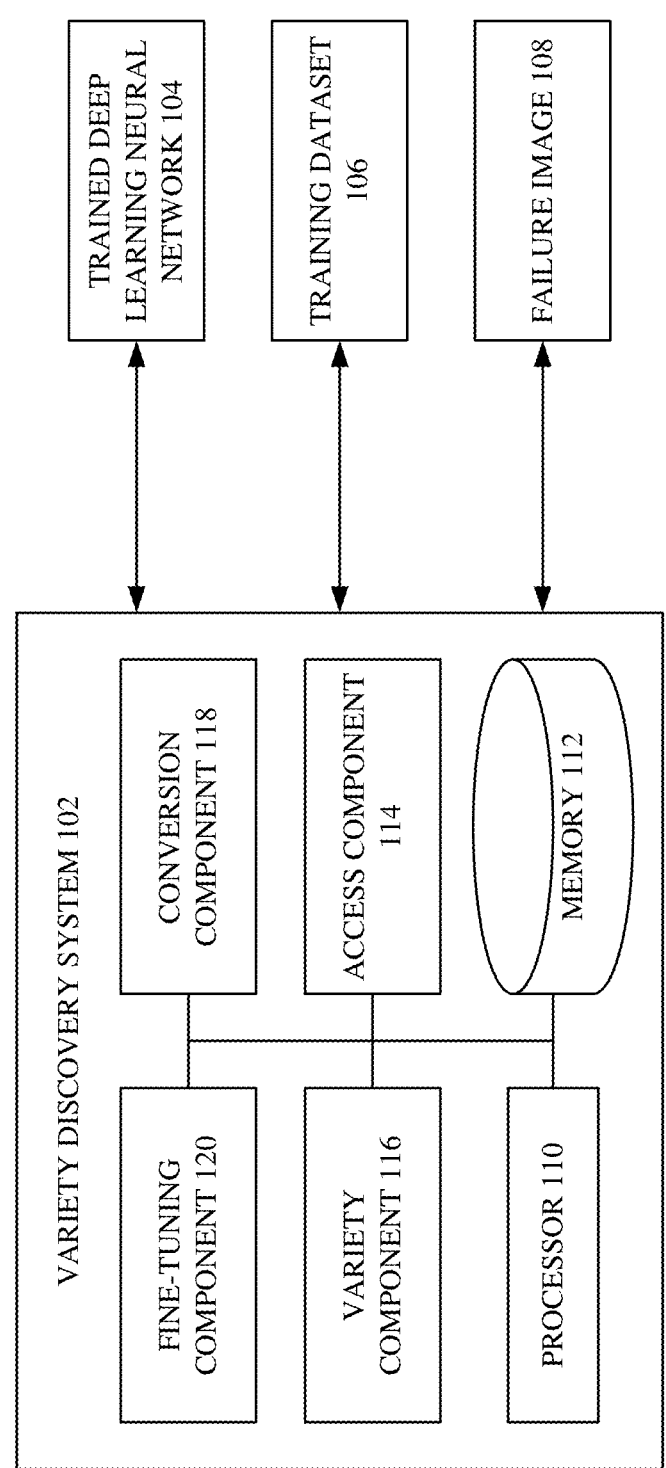
FIG. 1 illustrates a block diagram of an example, non-limiting system that facilitates automatic image variety simulation for improved deep learning performance in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A deep learning neural network can be trained (e.g., in supervised fashion, in unsupervised fashion, in reinforcement learning fashion) to perform an inferencing task (e.g., classification, segmentation, regression) on inputted images. After being trained, the deep learning neural network can be deployed in the field, so as to perform the inferencing task on inputted images that lack ground-truth annotations. For example, the deep learning neural network can be deployed in a medical or clinical field, so as to generate classification labels, segmentation masks, or regression results for medical images that are captured or generated by medical imaging equipment (e.g., by computed tomography (CT) scanners, by magnetic resonance imaging (MRI) scanners, by X-ray scanners, by ultrasound scanners, by positron emission tomography (PET) scanners). As another example, the deep learning neural network can be deployed in a computer vision field, so as to generate classification labels, segmentation masks, or regression results for images captured by vehicle cameras, drone cameras, robot cameras, or security cameras.

Despite being trained, the deep learning neural network can nevertheless fail to accurately or correctly perform the inferencing task during deployment. If the deep learning neural network is found (e.g., through client feedback) to have inaccurately performed the inferencing task on images during deployment, retraining can be warranted so as to improve robustness of the deep learning neural network (e.g., so as to rectify one or more identified failure modes of the deep learning neural network). To facilitate such retraining, it can be desirable to generate or synthesize large quantities of new images that are somehow substantively or visually different or diverse from whatever images on which the deep learning neural network was originally trained.

Unfortunately, existing techniques for such generation or synthesis of new images are excessively expensive with respect to computational resources or training data acquisition.

Indeed, some existing techniques involve augmentation pipelines that attempt to introduce substantive diversity into the images on which the deep learning neural network was originally trained, by transforming such training images with mathematical operations (e.g., Gaussian blurring. Fourier transforms, threshold weighting, forward projections, back projections, optical distortions) that are meticulously manually selected by subject matter experts. For case of explanation, these can be referred to as existing manual techniques. The augmentation pipelines of such existing manual techniques can take weeks or months to develop. Moreover, the augmentation pipelines of such existing manual techniques are not transferable across imaging modalities (e.g., if a given augmentation pipeline is created to augment CT images, that given augmentation pipeline cannot reliably or properly augment X-ray images without significant manual modification).

Other existing techniques attempt to address these issues of existing manual techniques via deep learning. For case of explanation, these existing techniques can be referred to as existing deep learning techniques. Some existing deep learning techniques utilize deep learning style transfer. In particular, such existing deep learning techniques train a style transfer network to translate images to some target visual style. Accordingly, that style transfer network can be used to convert the training images on which the deep learning neural network was originally trained to that target visual style, thereby adding substantive diversity to those training images. However, the style transfer network of such existing deep learning techniques is often trained using a voluminous amount of specially-curated paired images. Note that each of such image pairs can be referred to as "specially-curated" because the visual contents and visual styles of any given image pair must satisfy various criteria. Indeed, each specially-curated pair must have a first image and a second image, where the second image is known to accurately or correctly show what the visual content of the first image would look like in the target visual style (e.g., the second image can be considered as a ground-truth annotation for the first image). Unfortunately, it can often be highly time-consuming and expensive to obtain such specially-curated paired images.

Other existing deep learning techniques utilize cycle-generative-adversarial-networks (Cycle-GAN). In particular, such other existing deep learning techniques involve training, in conjunction with a first discriminator network, a first generator network to translate images from a source visual style to a target visual style, and also involve training, in conjunction with a second discriminator network, a second generator network to translate images from the target visual style back to the source visual style, where cycle consistency is enforced on the two generator networks. Accordingly, if the training images on which the deep learning neural network was originally trained belong to the source visual style, then the first generator network can be used to convert those training images to the target visual style, thereby adding substantive diversity to those training images. Rather than using voluminous amounts of specially-curated paired images, such other existing deep learning techniques can be trained using voluminous amounts of specially-curated unpaired images. Just as above, note that each of such unpaired images can be referred to as "specially-curated" because its visual style must satisfy various criteria. Indeed, such other existing deep learning techniques require very many first images that are known to have the source visual style (e.g., these can be considered as source style exemplars) and also require very many second images that are known to have the target visual style (e.g., these can be considered as target style exemplars), though the very many second images need not be respectively paired with (e.g., need not have the same visual contents as) the very many first images. Although slightly easier to obtain than specially-curated paired images, such specially-curated unpaired images can nevertheless be highly time-consuming and expensive to acquire. Furthermore, the first generator network of Cycle-GAN is limited by whatever source visual style it is trained on, such that the first generator network cannot accurately or reliably convert to the target visual style images that do not belong to the source visual style. In other words, the first generator network exhibits highly restricted generalizability. Further still, Cycle-GAN involves training at least four distinct neural networks (e.g., two generators and two discriminators) per source-target style transformation that is desired, which is very computationally costly.

Accordingly, systems or techniques that can reduce the computational cost of existing deep learning techniques can be desirable.

Various embodiments described herein can address one or more of these technical problems. One or more embodiments described herein can include systems, computer-implemented methods, apparatus, or computer program products that can facilitate automatic image variety simula-tion for improved deep learning performance. In other words, the inventors of various embodiments described herein devised various techniques that can, in automated and inexpensive fashion, add substantive diversity to the training data on which a deep learning neural network was originally trained, so that the robustness of the deep learning neural network can be increased via retraining or fine-tuning on such diversified training data. In particular, if the deep learning neural network encounters during deployment a failure image for which it generates an incorrect inferencing task result, such techniques can involve training another deep learning neural network to learn a visual variety or style of that failure image. As described herein, such training can be facilitated via a novel loss function that can eschew any need for a voluminous amount of specially-curated paired or unpaired images. Indeed, as described herein, the failure image itself can be treated as a type of universal ground-truth against which visual variety dissimilarities (e.g., such as Gram matrix differences) can be computed across multiple sizing scales. Moreover, as described herein, the another deep learning neural network can be trained on any suitable dummy images (e.g., images whose contents or visual varieties/styles need not be constrained or otherwise related in any way to those of the failure image). Accordingly, the techniques described herein can be considered as novel deep learning techniques that can consume fewer computational resources than existing deep learning techniques.

Various embodiments described herein can be considered as a computerized tool (e.g., any suitable combination of computer-executable hardware or computer-executable software) that can facilitate automatic image variety simulation for improved deep learning performance. In various aspects, such computerized tool can comprise an access component, a variety component, a conversion component, or a fine-tuning component.

In various embodiments, there can be a first deep learning neural network. In various aspects, the first deep learning neural network can exhibit any suitable deep learning internal architecture. For example, the first deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the first deep learning neural network can include any suitable numbers of neurons in various layers (e.g., different layers can have the same or different numbers of neurons as each other). As yet another example, the first deep learning neural network can include any suitable activation functions (e.g., softmax, sigmoid, hyperbolic tangent, rectified linear unit) in various neurons (e.g., different neurons can have the same or different activation functions as each other). As still another example, the first deep learning neural network can include any suitable interneuron connections or interlayer connections (e.g., forward connections, skip connections, recurrent connections).

Regardless of its internal architecture, the first deep learning neural network can be configured to perform an inferencing task on any suitable inputted images. In various aspects, the first deep learning neural network can be configured to operate on images having any suitable format, size, or dimensionality (e.g., can be configured to operate on two-dimensional pixel arrays, or can be configured to operate on three-dimensional voxel arrays). In various instances, the first deep learning neural network can be configured to operate on images that are captured or generated by any suitable imaging modality (e.g., by a CT scanner, by an MRI scanner, by an X-ray scanner, by an ultrasound scanner, by a PET scanner). In various instances, the inferencing task can be any suitable computational, predictive task that can be performed on or with respect to an image. As some non-limiting examples, the inferencing task can be image classification (e.g., classifying or diagnosing a pathology depicted in a medical image), image segmentation (e.g., localizing the boundary of an anatomical structure or surgical implant depicted in a medical image), or image regression (e.g., denoising or enhancing resolution of a medical image, so as to aid diagnosis).

In various embodiments, the first deep learning neural network can be trained in any suitable fashion (e.g., in supervised fashion, in unsupervised fashion, in reinforcement learning fashion) on an original training dataset to perform the inferencing task. In various aspects, the original training dataset can comprise any suitable number of training images. In various instances, a training image can be any suitable image on which the first deep learning neural network can be executed (e.g., if the first deep learning neural network is configured to operate on two-dimensional pixel arrays captured by CT scanners, then a training image can be a two-dimensional pixel array captured by a CT scanner; if the first deep learning neural network is instead configured to operate on three-dimensional voxel arrays captured by MRI scanners, then a training image can instead be a three-dimensional voxel array captured by an MRI scanner). In various cases, the original training dataset can be unannotated (e.g., in such case, the first deep learning neural network can be trained in unsupervised or reinforcement learning fashion on the original training dataset). In other cases, however, the original training dataset can be annotated (e.g., in such case, the first deep learning neural network can be trained on the original training dataset in supervised fashion). That is, for each training image, the original training dataset can comprise a respective ground-truth annotation that corresponds to that training image. In various aspects, a ground-truth annotation can be any suitable electronic data that indicates a correct or accurate inferencing task result that is known to correspond to a respective training image. Accordingly, the format, size, or dimensionality of a ground-truth annotation can depend upon the inferencing task that the first deep learning neural network is configured to perform (e.g., if the inferencing task is image classification, then each ground-truth annotation can be a correct or accurate classification label corresponding to a respective training image; if the inferencing task is image segmentation, then each ground-truth annotation can be a correct or accurate segmentation mask corresponding to a respective training image; if the inferencing task is image regression, then each ground-truth annotation can be a correct or accurate regression result corresponding to a respective training image).

In various embodiments, there can be a failure image. In various aspects, the failure image can be any suitable image on which the first deep learning neural network is known or deemed to have incorrectly performed the inferencing task, post-training. In other words, the first deep learning neural network can be deployed in any suitable operational context after having been trained on the original training dataset, the first deep learning neural network can be executed during such deployment on the failure image, and whatever inferencing task result that the first deep learning neural network produced for the failure image can be judged by a user or technician as being incorrect or inaccurate, hence the term "failure". In any case, the failure image can be considered as exhibiting any suitable visual content (e.g., an anatomical structure of a medical patient, a surgical implant of a medical patient) according to any suitable visual variety or visual style. In various instances, the visual variety/style of the failure image can be considered as encompassing any suitable difficult-to-define visual qualities of the failure image, such as texture, contrast, color scheme, shading scheme, opaqueness or cloudiness, sharpness, or other visual patterns according to which the failure image depicts or conveys its visual content.

In various cases, the visual variety/style of the failure image can be different or distinct (though possibly very subtly so) from those of the training images in the original training dataset. In such case, it can be determined, concluded, or assumed that the first deep learning neural network incorrectly performed the inferencing task on the failure image due to the visual variety/style of the failure image (e.g., the first deep learning neural network can have not encountered the visual variety/style of the failure image during training; accordingly, the first deep learning neural network can be thrown off or distracted by that visual variety/style).

In various aspects, it can be desired to synthesize new training images that would make the first deep learning neural network robust against future images that have the same visual variety/style as the failure image. The computerized tool described herein can facilitate such synthesis in an automatic and low-cost fashion.

In various embodiments, the access component of the computerized tool can electronically receive or otherwise electronically access the first deep learning neural network, the original training dataset, or the failure image. In some aspects, the access component can electronically retrieve the first deep learning neural network, the original training dataset, or the failure image from any suitable centralized or decentralized data structures (e.g., graph data structures, relational data structures, hybrid data structures), whether remote from or local to the access component. In any case, the access component can electronically obtain or access the first deep learning neural network, the original training dataset, or the failure image, such that other components of the computerized tool can electronically interact with (e.g., read, write, edit, copy, manipulate) the first deep learning neural network, with the original training dataset, or with the failure image.

In various embodiments, the variety component of the computerized tool can electronically store, maintain, control, or otherwise access a second deep learning neural network. In various aspects, the second deep learning neural network can exhibit any suitable deep learning internal architecture. For example, the second deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the second deep learning neural network can include any suitable numbers of neurons in various layers (e.g., different layers can have the same or different numbers of neurons as each other). As yet another example, the second deep learning neural network can include any suitable activation functions (e.g., softmax, sigmoid, hyperbolic tangent, rectified linear unit) in various neurons (e.g., different neurons can have the same or different activation functions as each other). As still another example, the second deep learning neural network can include any suitable interneuron connections or interlayer connections (e.g., forward connections, skip connections, recurrent connections).

In any case, the variety component can electronically train the second deep learning neural network to learn or discover the visual variety/style exhibited by the failure image. That is, the variety component can train the second deep learning neural network to receive as input any given image and to produce as output a transformed version of that given image, which transformed version has the visual content of the given image but the visual variety/style of the failure image. In various aspects, the variety component can train the second deep learning neural network, based on any suitable dummy images, and based on a loss function having a content error term and a multi-scale variety/style error term.

In various aspects, a dummy image can be any suitable image whatsoever that has the same format, size, or dimensionality as the failure image or as any training image in the original training dataset but that is otherwise unconstrained. That is, visual content or visual variety/style of a dummy image can be unlimited or can otherwise not have to satisfy any special criteria. In other words, a dummy image can have any suitable visual content whatsoever and any suitable visual variety/style whatsoever, even if that visual content or visual variety/style are completely unrelated to those of the failure image or to those of the training images. As a non-limiting example, a dummy image can be a randomly-selected image that has nothing at all to do with the failure image or with any training image (e.g., the failure image and the training images can be medical images depicting anatomical structures of respective medical patients, whereas a dummy image can be a scenic nature image, an image of a birthday party, an image from a cinematic film, or even an image of a cartoon character).

In various aspects, the variety component can randomly initialize the trainable internal parameters (e.g., convolutional kernels, weight matrices, bias values) of the second deep learning neural network. After such initialization, the variety component can train the second deep learning neural network as follows.

In various instances, the variety component can select any given dummy image. In various cases, the variety component can execute the second deep learning neural network on the given dummy image, which can cause the second deep learning neural network to produce some output. More specifically, the variety component can feed the given dummy image to an input layer of the second deep learning neural network, the given dummy image can complete a forward pass through one or more hidden layers of the second deep learning neural network, and an output layer of the second deep learning neural network can compute the output based on activations from the one or more hidden layers of the second deep learning neural network.

Note that, in various cases, the format, size, or dimensionality of the output can be controlled or otherwise determined by the number, arrangement, or sizes of neurons or other internal parameters (e.g., convolutional kernels) that are contained in or that otherwise make up the output layer (or any other layers) of the second deep learning neural network. Thus, the output can be forced to have any desired format, size, or dimensionality by adding, removing, or otherwise adjusting neurons or other internal parameters to, from, or within the output layer (or any other layers) of the second deep learning neural network. Accordingly, in various aspects, the output can be forced to have the same format, size, or dimensionality as the given dummy image.

In various cases, the output can be considered as being an inferred or predicted version of the given dummy image, which version is supposed to have the visual content of the given dummy image but the visual variety/style of the failure image. Note that, if the second deep learning neural network has so far undergone no or little training, then the output can look like random, noisy, or otherwise inaccurate visual gibberish. Moreover, note that the given dummy image can be unannotated. In other words, there can be no ground-truth that is known or deemed to accurately show how the given dummy image would visually look or appear when rendered according to the visual variety/style of the failure image. To overcome this, the given dummy image and the failure image themselves can be treated as pseudo-ground-truths, as follows.

As mentioned above, the variety component can utilize a loss function that has a content error term and a multi-scale variety/style error term.

In various aspects, the variety component can compute the content error term based on the output and the given dummy image. In various aspects, the content error term can be equal to or otherwise based on any suitable mathematical expression that captures or quantifies visual content dissimilarities between the output and the given dummy image (e.g., mean absolute error (MAE), mean squared error (MSE), cross-entropy error).

In various instances, the variety component can compute the multi-scale variety/style error term based on the output and the failure image. In particular, there can be a plurality of image scales. In various cases, each image scale can be considered as decomposing any image into a distinct or unique number of disjoint regions. Accordingly, for each image scale, the output and the failure image can each be decomposed according to the regions of that image scale, such that each region of the output corresponds to a respective region of the failure image. In various aspects, for each region of the output, the variety component can compute a Gram matrix difference (or any other suitable variety/style-capturing mathematical expression) between that region of the output and a respectively corresponding region of the failure image, thereby yielding a plurality of sets of region-wise Gram matrix differences (e.g., one distinct set of region-wise Gram matrix differences per distinct image scale). In various instances, the multi-scale variety/style error term can be equal to or otherwise based on any suitable aggregation (e.g., weighted or unweighted linear or multiplicative combination or average) of the plurality of sets of region-wise Gram matrix differences.

As a non-limiting example, suppose that there are a total of three image scales: an image scale A, an image scale B, and an image scale C. Suppose that the image scale A is a global scale that decomposes any image into a single region that is equivalent to the image itself. Furthermore, suppose that the image scale B is a more granular scale that decomposes any image into a left half and a right half. Further still, suppose that the image scale C is an even more granular scale that decomposes any image into a top-left quadrant, a top-right quadrant, a bottom-left quadrant, and a bottom-right quadrant.

Now, at the image scale A, the output can be considered as itself being one big region, and the failure image can likewise be considered as itself being one big region. So, at the image scale A, the variety component can compute a region-wise Gram matrix difference between the output and the failure image (e.g., such Gram matrix difference can be considered as quantifying textural, contrast, or other variety/ style dissimilarities between the entirety of the output and the entirety of the failure image).

In contrast, at the image scale B, the output can be considered as having a left-half region and a right-half region, and the failure image can likewise be considered as having a left-half region and a right-half region. Thus, at the image scale B, the variety component can compute two region-wise Gram matrix differences. In particular, the variety component can compute a region-wise Gram matrix difference between the left-half region of the output and the left-half region of the failure image (e.g., such Gram matrix difference can be considered as quantifying textural, contrast, or other variety/style dissimilarities between the left-half region of the output and the left-half region of the failure image), and the variety component can compute another region-wise Gram matrix difference between the right-half region of the output and the right-half region of the failure image (e.g., such Gram matrix difference can be considered as quantifying textural, contrast, or other variety/style dissimilarities between the right-half region of the output and the right-half region of the failure image).

Now, at the image scale C, the output can be considered as having a top-left region, a top-right region, a bottom-left region, and a bottom-right region, and the failure image can likewise be considered as having a top-left region, a top-right region, a bottom-left region, and a bottom-right region. Accordingly, at the image scale C, the variety component can compute four region-wise Gram matrix differences. In particular, the variety component can compute a region-wise Gram matrix difference between the top-left region of the output and the top-left region of the failure image (e.g., such Gram matrix difference can be considered as quantifying textural, contrast, or other variety/style dissimilarities between the top-left region of the output and the top-left region of the failure image). Moreover, the variety component can compute another region-wise Gram matrix difference between the top-right region of the output and the top-right region of the failure image (e.g., such Gram matrix difference can be considered as quantifying textural, contrast, or other variety/style dissimilarities between the top-right region of the output and the top-right region of the failure image). Furthermore, the variety component can compute yet another region-wise Gram matrix difference between the bottom-left region of the output and the bottom-left region of the failure image (e.g., such Gram matrix difference can be considered as quantifying textural, contrast, or other variety/style dissimilarities between the bottom-left region of the output and the bottom-left region of the failure image). Further still, the variety component can compute even another region-wise Gram matrix difference between the bottom-right region of the output and the bottom-right region of the failure image (e.g., such Gram matrix difference can be considered as quantifying textural, contrast, or other variety/style dissimilarities between the bottom-right region of the output and the bottom-right region of the failure image).

Accordingly, in this non-limiting example, the variety component can compute a total of seven distinct region-wise Gram matrix differences, and the multi-scale variety/style error term can be equal to or otherwise based on any suitable weighted or unweighted linear, multiplicative, or exponential combination of those seven distinct region-wise Gram matrix differences.

In any case, the variety component can compute the content error term and the multi-scale variety/style error term as described above, and the loss function can be equal to or otherwise based on any suitable aggregation (e.g., weighted or unweighted linear or multiplicative combination) of the content error term and of the multi-scale variety/style error term.

In various instances, the variety component can incrementally update the trainable internal parameters of the second deep learning neural network, by performing backpropagation (e.g., stochastic gradient descent) driven by the loss function.

In various cases, the variety component can repeat the above-described training procedure for any suitable number of dummy images. Such repetition can cause the loss function, and thus both the content error term and the multi-scale variety/style error term, to become reduced or otherwise minimized. Such reduction or minimization can cause the trainable internal parameters of the second deep learning neural network to become iteratively optimized for converting any inputted image to the visual variety/style of the failure image (e.g., thanks to the multi-scale variety/style error term) while maintaining or preserving the visual content of that inputted image (e.g., thanks to the content error term). That is, such training can cause the second deep learning neural network to learn or discover the visual variety/style of the failure image. In various aspects, the variety component can implement any suitable training batch sizes or any suitable training termination criterion when training the second deep learning neural network.

In any case, note how computationally inexpensive training of the second deep learning neural network can be. In particular, such training can be facilitated in automated fashion without human intervention, unlike existing manual techniques. Moreover, such training can be applied, regardless of the modalities that were used to capture or generate the failure image or the dummy images, unlike existing manual techniques. Furthermore, note that the conversion component can train the second deep learning neural network without voluminous amounts of specially-curated paired or unpaired images, unlike existing deep learning techniques. Indeed, as described above, the second deep learning neural network can be trained using only the failure image and any suitable number of dummy images whose visual contents or visual varieties/styles need not be specially chosen in any way (e.g., the failure image can be a scanned medical image, whereas the dummy images can be stock images of nature scenes or birthday parties). In other words, it can be considered as not difficult or time-consuming to acquire the dummy images, since the dummy images need not satisfy any special content-related or variety/style-related criteria. In stark contrast, it can be considered as significantly more difficult or time-consuming to acquire very many specially-curated paired images, which are often utilized by existing deep learning techniques that implement style transfer. Likewise, it can also be considered as significantly more difficult or time-consuming to acquire very many source style exemplars and very many target style exemplars, which are required by existing deep learning techniques that implement Cycle-GAN. In this way, training of the second deep learning neural network as described herein can be considered as being significantly less costly or expensive in terms of training data acquisition than existing deep learning techniques.

Additionally, note that the multi-scale variety/style error term can be considered as boosting how well the second deep learning neural network is able to learn the visual variety/style of the failure image. Indeed, as described above, the multi-scale variety/style error term can be an aggregation of multiple region-wise Gram matrix differences that are computed, between the failure image and training outputs predicted by the second deep learning neural network, across multiple different image scales (e.g., from a global scale, to a granular scale, to an even more granular scale). In various instances, region-wise Gram matrix differences computed at any one image scale can be considered as collectively measuring, capturing, or quantifying one or more respective levels, types, aspects, or manifestations of visual variety/style. However, it is possible that other pertinent levels, types, aspects, or manifestations of visual variety/style are not measurable, capturable, or quantifiable at that one image scale. Accordingly, region-wise Gram matrix differences computed across multiple different image scales can be considered as collectively measuring, capturing, or quantifying more levels, types, aspects, or manifestations of visual variety/style than could be accomplished at any single image scale alone. In other words, by computing region-wise Gram matrix differences across multiple image scales, whatever visual variety/style dissimilarities there might be between the training outputs predicted by the second deep learning neural network and the failure image can be more fully, completely, richly, or thoroughly measured, captured, or quantified, as opposed to instead computing Gram matrix differences only at a single image scale alone. In other words, the multi-scale variety/style error term described herein can be considered as helping the second deep learning neural network to more quickly or accurately learn the visual variety/style of the failure image. Existing deep learning techniques do not incorporate such a multi-scale variety/style error term.

Furthermore, note that, as mentioned above, the dummy images on which the second deep learning neural network is trained can have any suitable visual varieties/styles whatsoever. Accordingly, it can be the case that different dummy images have the same or different visual varieties as each other. Thus, after being trained, the second deep learning neural network can be considered as not being limited to operating only on images that exhibit one particular visual variety/style. Instead, the second deep learning neural network, when trained as described herein, can be considered as being generalizable so as to operate on images that have any suitable visual varieties/styles. Moreover, the present inventors experimentally found that the generalizability of the second deep learning neural network can be even further improved or boosted when at least some of the dummy images are scenic nature images (e.g., pictures of flowers, trees, gardens, forests, or jungles). In other words, it was found that being trained on such scenic nature images caused the second deep learning neural network to more accurately operate on images whose visual styles/varieties it had not encountered during training.

In various embodiments, the conversion component of the computerized tool can electronically generate a converted training dataset, by executing, after the above-described training by the variety component, the second deep learning neural network on each training image in the original training dataset. In particular, for any given training image in the original training dataset, the conversion component can execute the second deep learning neural network on that given training image, thereby yielding a converted training image that has the same visual content as that given training image but that exhibits the visual variety/style of the failure image. More specifically, the conversion component can feed that given training image to the input layer of the second deep learning neural network, that given training image can complete a forward pass through the one or more hidden layers of the second deep learning neural network, and the output layer of the second deep learning neural network can compute the converted training image based on activations provided by the one or more hidden layers of the second deep learning neural network. In this way, all of the training images in the original training dataset can be transformed into converted training images, and such converted training images can collectively be considered as forming the converted training dataset. Note that, if the original training dataset is unannotated, then the converted training dataset can also be annotated. Conversely, if the original training dataset is annotated, then the converted training dataset can also be annotated (e.g., the converted training images can have the same visual contents as the training images; thus, any ground-truth annotations in the original training dataset can be considered as equally applicable to the converted training images as they are to the training images).

In various aspects, the conversion component can electronically verify or confirm (as a sort of sanity check) that the second deep learning neural network has properly learned the visual variety/style of the failure image. In various instances, the conversion component can facilitate such verification or confirmation by executing the first deep learning neural network on both a training image and a corresponding converted training image and by subsequently comparing the ensuing inferencing task results produced by the first deep learning neural network. Those ensuing inferencing task results being sufficiently dissimilar from each other can be considered as evidence that is consistent with the second deep learning neural network having properly learned to recreate the visual variety/style of the failure image. In contrast, those ensuing inferencing task results being insufficiently dissimilar from each other can be considered as evidence that is inconsistent with the second deep learning neural network having properly learned to recreate the visual variety/style of the failure image.

As a non-limiting example, consider a training image D and a converted training image E that corresponds to the training image D (e.g., the second deep learning neural network can have generated the converted training image E from the training image D). Because the first deep learning neural network encountered the training image D during training, it can be expected that the first deep learning neural network knows how to correctly perform the inferencing task on the training image D. Conversely, because the converted training image E has been produced by the second deep learning neural network and thus exhibits the visual variety/style of the failure image, it can be expected that the first deep learning neural network does not know how to correctly perform the inferencing task on the converted training image E. In other words, it can be expected that the first deep learning neural network produce a sufficiently different inferencing task result for the training image D than for the converted training image E. In various aspects, the conversion component can check this expectation. In particular, the conversion component can execute the first deep learning neural network on the training image D, thereby yielding an inferencing task result F (e.g., a classification label, segmentation mask, or regression result that the first deep learning neural network has inferred for the training image D). Likewise, the conversion component can execute the first deep learning neural network on the converted training image E, thereby yielding an inferencing task result G (e.g., a classification label, segmentation mask, or regression result that the first deep learning neural network has inferred for the converted training image E). In various aspects, the conversion component can compute any suitable error (e.g., MAE, MSE, cross-entropy) between the inferencing task result F and the inferencing task result G. If that computed error is greater than any suitable threshold (e.g., if the inferencing task result F and the inferencing task result G are sufficiently dissimilar to each other), the conversion component can conclude that the second deep learning neural network properly learned the visual variety/style of the failure image (e.g., it can be concluded that whatever visual variety/style that the second deep learning neural network learned to recreate successfully distracted or threw off the first deep learning neural network). On the other hand, if that computed error is less than any suitable threshold (e.g., if the inferencing task result F and the inferencing task result G are insufficiently dissimilar to each other), the conversion component can conclude that the second deep learning neural network did not properly learn the visual variety/style of the failure image (e.g., it can be concluded that whatever visual variety/style that the second deep learning neural network learned to recreate did not successfully distract or throw off the first deep learning neural network).

In this way, the conversion component can verify or confirm whether the second deep learning neural network was properly or sufficiently trained to learn the visual variety/style of the failure image.

In various embodiments, the fine-tuning component of the computerized tool can electronically combine the original training dataset and the converted training dataset together, thereby yielding an aggregated training dataset. In various aspects, the aggregated training dataset can be considered containing whatever training images that the first deep learning neural network was originally trained on, as well as containing the converted training images created by the conversion component. Thus, the aggregated training dataset can be considered as an augmented version of the original training dataset that can be used to improve or heighten the robustness of the first deep learning neural network. Indeed, in various cases, the fine-tuning component can electronically retrain or fine-tune (e.g., in supervised, unsupervised, or reinforcement learning fashion) the first deep learning neural network on the aggregated training dataset. After such retraining or fine-tuning, the first deep learning neural network can be considered as now being robust against the visual variety/style of the failure image (e.g., can now be considered as having learned how to accurately perform the inferencing task on images that exhibit the visual variety/style of the failure image).

In various embodiments, the access component, the variety component, the conversion component, and the fine-tuning component can repeat any of the above-mentioned actions for any suitable number of failure images encountered by the first deep learning neural network. Such repetition can cause the aggregated training dataset to become even more iteratively enlarged or augmented. In some instances, the fine-tuning component refrain from retraining or fine-tuning the first deep learning neural network, until after the original training dataset has been augmented in accordance with each failure image that has been encountered. Indeed, such postponement of retraining or fine-tuning can be considered as avoiding redundant training epochs. As a non-limiting example, suppose that s failure images are identified, for any suitable positive integer s. It can be inefficient to retrain the first deep learning neural network s separate or distinct times. Instead, the original training dataset can be augmented via variety/style discovery as described herein for each of those s failure images, and the first deep learning neural network can be retrained or fine-tuned once at the end of such augmentation.

Various embodiments described herein can be employed to use hardware or software to solve problems that are highly technical in nature (e.g., to facilitate automatic image variety simulation for improved deep learning performance), that are not abstract and that cannot be performed as a set of mental acts by a human. Further, some of the processes performed can be performed by a specialized computer (e.g., deep learning neural networks having internal parameters such as convolutional kernels) for carrying out defined acts related to deep learning.

For example, such defined acts can include: accessing, by a device operatively coupled to a processor, a failure image on which a first deep learning neural network has inaccurately performed an inferencing task; training, by the device and on a set of dummy images, a second deep learning neural network to learn a first visual variety of the failure image, based on a loss function having a first term and a second term, wherein the first term quantifies visual content dissimilarities between the set of dummy images and outputs predicted during training by the second deep learning neural network, and wherein the second term quantifies, at a plurality of different image scales, visual variety dissimilarities between the failure image and the outputs predicted during training by the second deep learning neural network; and executing, by the device, the second deep learning neural network on each of a set of training images on which the first deep learning neural network was trained, thereby yielding a set of first converted training images that exhibit the first visual variety of the failure image. In some cases, such defined acts can also include: retraining, by the device, the first deep learning neural network on the set of training images and on the set of first converted training images.

Such defined acts are not performed manually by humans. Indeed, neither the human mind nor a human with pen and paper can: electronically access an image (e.g., a pixel array, a voxel array) that a first neural network has incorrectly analyzed; electronically train, on dummy images, a second neural network to learn the visual variety/style of that image using a loss function, whose first term captures visual content mismatches between the dummy images and training outputs produced by the second neural network, and whose second term captures, across multiple image scales, visual variety/style mismatches between the failure image and the training outputs; electronically convert, by executing the second neural network, training images on which the first neural network was trained to the visual variety/style of the failure image; or electronically retrain the first neural network on those augmented training images. Indeed, a deep learning neural network is an inherently-computerized construct that simply cannot be meaningfully executed or trained in any way by the human mind without computers. Accordingly, a computerized tool that can automatically synthesize, via the second neural network, augmented training images so as to increase the robustness of the first neural network is likewise inherently-computerized and cannot be implemented in any sensible, practical, or reasonable way without computers.

Moreover, various embodiments described herein can integrate into a practical application various teachings relating to automatic image variety simulation for improved deep learning performance. As explained above, existing manual techniques involve manually-crafted and complicated augmentation pipelines that are not easily transferable across imaging modalities. As also explained above, existing deep learning techniques that implement style transfer can rely on voluminous amounts of specially-curated paired images which can be cumbersome and costly to acquire. Additionally, as explained above, existing deep learning techniques that implement Cycle-GAN require voluminous amounts of specially-curated unpaired images, require four separate deep learning neural networks (e.g., two generators, two discriminators) to be trained for each source-target style combination that is desired, and do not generalize beyond whatever source style on which they are trained. Accordingly, various existing techniques can be considered as significantly expensive or costly (e.g., in terms of development time, training time, or training data acquisition).

In stark contrast, various embodiments described herein can address one or more of these technical problems. Specifically, whenever a first neural network incorrectly analyzes an image (referred to as a failure image), various embodiments described herein can involve training a second neural network to learn whatever visual variety/style is exhibited by the failure image. That is, the second neural network can be trained to receive as input any given image and to produce as output a transformed version of the given image, which transformed version has the same visual content as the given image, but which transformed version has the visual variety/style of the failure image. As described herein, the second neural network can be trained on dummy images, whose visual contents or visual varieties/styles need not satisfy any special criteria, using a loss function that quantifies (e.g., via region-wise Gram matrix differences) the visual variety/style of the failure image across multiple sizing scales.

Such embodiments can be considered as advantageous over existing manual techniques. After all, the second neural network can be trained in wholly automated fashion and thus in the absence of human intervention, unlike existing manual techniques. Moreover, the second neural network can be trained as described herein no matter the imaging modalities of the failure image or of the dummy images, unlike existing manual techniques.

Such embodiments can also be considered as advantageous over existing deep learning techniques that implement style transfer. After all, the second neural network can be trained on the dummy images which can have any suitable visual contents and visual varieties/styles whatsoever. In other words, the visual contents and visual varieties/styles of the dummy images need not be substantively related in any way to those of the failure image. As a non-limiting example, the failure image can be a scanned medical image (e.g., CT scanned image, MRI scanned image, X-ray scanned image) that depicts an anatomical structure (e.g., body part, organ, tissue, or portion thereof) of a medical patient, whereas a dummy image can instead be a picture of flowers, trees, clowns, or a birthday party. In other words, the dummy images need not satisfy any specific content-related or variety/style-related restrictions and can thus be whatever images are easily available or easily acquirable. Contrast this with existing deep learning techniques that implement style transfer, which instead can rely on very many paired images that satisfy specific content-related and variety/style-related restrictions (e.g., due to such restrictions, it can be difficult or costly to obtain such paired images).

Such embodiments can further be considered as advantageous over existing deep learning techniques that implement Cycle-GAN. Indeed, Cycle-GAN requires very many unpaired images that must satisfy specific variety/style-related restrictions (e.g., due to such restrictions, it can be difficult or costly to obtain such paired images). In stark contrast, as mentioned above, various embodiments described herein can train the second neural network using easily acquirable dummy images. Also, various embodiments described herein can train the second neural network using a single target image (e.g., the failure image), rather than a voluminous amount of target style exemplars. Furthermore, for any given target variety/style, Cycle-GAN requires at least four distinct neural networks to be trained from scratch (e.g., two generators and two discriminators), which can consume excessive time and processing capacity during training. In stark contrast, for any given failure image, various embodiments described herein can involve training a single neural network (e.g., the second neural network mentioned above) from scratch. Such embodiments can therefore consume significantly less time and processing capacity during training. Further still, any implementation of Cycle-GAN can be considered as limited only to, or otherwise not generalizable beyond, whatever source variety/style it is trained on. In stark contrast, the second neural network of various embodiments described herein, even after training, can be generalizable across various input-side varieties/styles. After all, the dummy images on which the second neural network is trained can exhibit any suitable visual varieties/styles whatsoever (e.g., such that different dummy images can exhibit the same or different visual varieties/styles as each other), which can cause the second neural network to not be limited to operating only on one specific input-side visual variety/style. In fact, as mentioned above, the present inventors even experimentally found that, when the failure image is a scanned medical image, the generalizability of the second neural network can be further improved if at least some of the dummy images are scenic nature images. Note how counterintuitive or unexpected this is: that the visual variety/style of a scanned medical image can be accurately learned via training on completely unrelated, non-medical images (e.g., on pictures of flowers or trees).

A further technical benefit of various embodiments described herein can be implementation of the multi-scale variety/style error term. Indeed, as mentioned above, Gram matrix differences that are computed at a single image scale can be considered as measuring one or more respective manifestations of visual variety/style. But it is possible that various other manifestations of visual variety/style are not well measurable at that single image scale (e.g., are not adequately captured by Gram matrix computations at the single image scale). As a non-limiting example, visual texture of an image might be more easily measured or captured at a more granular image scale, whereas visual contrast of an image might instead be more easily measured or captured at a less granular image scale. Therefore, visual variety/style can be more fully or thoroughly captured by computing Gram matrix differences across a plurality of distinct image scales. In other words, visual variety/style can be learned or discovered more quickly or more accurately, when Gram matrix differences are computed across a plurality of different image scales.

For at least these reasons, various embodiments described herein are less costly or burdensome than existing techniques and thus certainly constitute a concrete and tangible technical improvement in the field of deep learning. Therefore, various embodiments described herein clearly qualify as useful and practical applications of computers.

Furthermore, various embodiments described herein can control real-world tangible devices based on the disclosed teachings. For example, various embodiments described herein can electronically train or execute real-world deep learning neural networks on real-world images (e.g., X-ray scanned images, CT scanned images, scenic nature images), and can electronically render on real-world computer screens real-world inferencing task results (e.g., classification labels, segmentation masks, regression results) produced by such real-world deep learning neural networks.

It should be appreciated that the herein figures and description provide non-limiting examples of various embodiments and are not necessarily drawn to scale.

FIG. 1 illustrates a block diagram of an example, non-limiting system 100 that can facilitate automatic image variety simulation for improved deep learning performance in accordance with one or more embodiments described herein. As shown, a variety discovery system 102 can be electronically integrated, via any suitable wired or wireless electronic connections, with a trained deep learning neural network 104, with a training dataset 106, and with a failure image 108.

In various embodiments, the trained deep learning neural network 104 can be any suitable artificial neural network that can have or otherwise exhibit any suitable internal architecture. For instance, the trained deep learning neural network 104 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the trained deep learning network 104 can be configured to perform any suitable inferencing task on inputted images having any suitable format, size, or dimensionality. As a non-limiting example, the trained deep learning neural network 104 can be configured to perform the inferencing task on an image that is an x-by-y array of pixels, for any suitable positive integers x and y. As another non-limiting example, the trained deep learning neural network 104 can be configured to perform the inferencing task on an image that is an x-by-y-by-z array of voxels, for any suitable positive integers x, y, and z. Moreover, the trained deep learning neural network 104 can be configured to perform the inferencing task on images that are captured or generated by any suitable imaging modality. As a non-limiting example, the trained deep learning neural network 104 can be configured to perform the inferencing task on images that are captured or generated by CT scanners, MRI scanners, X-ray scanners, ultrasound scanners, or PET scanners.

In any case, the trained deep learning neural network 104 can be configured to receive as input an image and to produce as output an inferencing task result for that image. In various instances, the format, size, or dimensionality of the inferencing task result can depend upon the inferencing task that the trained deep learning neural network 104 is configured to perform. As a non-limiting example, the inferencing task can be image classification. In such case, the inferencing task result can be a classification label that the trained deep learning neural network 104 has predicted for the image. As another non-limiting example, the inferencing task can be image segmentation. In such case, the inferencing task result can be a segmentation mask that the trained deep learning neural network 104 has predicted for the image. As yet another non-limiting example, the inferencing task can be image regression. In such case, the inferencing task result can be a regression output (e.g., denoised image, resolution enhanced image, or other continuously-variable output) that the trained deep learning neural network 104 has predicted for the image.

In various embodiments, the trained deep learning neural network 104 can be previously trained on the training dataset 106 to perform the inferencing task on inputted images. Accordingly, the training dataset 106 can comprise any suitable number of training images. In some instances, the training images can be annotated, in which case the trained deep learning neural network 104 can be previously trained in supervised fashion on the training dataset 106. In other instances, the training images can be unannotated, in which case the trained deep learning neural network 104 can be previously trained in unsupervised or reinforcement learning fashion on the training dataset 106. Non-limiting aspects are described with respect to FIG. 2.

FIG. 2 illustrates an example, non-limiting block diagram 200 of the training dataset 106 in accordance with one or more embodiments described herein.

As shown, the training dataset 106 can comprise a set of training images 202. In various aspects, the set of training images 202 can comprise n images, for any suitable positive integer n: a training image 202(1) to a training image 202(n). In various instances, each of the set of training images 202 can be any suitable image on which the trained deep learning neural network 104 can perform the inferencing task. As a non-limiting example, the trained deep learning neural network 104 can be configured to operate on x-by-y pixel arrays that are captured or generated by a CT scanner. In such case, each of the set of training images 202 can be an x-by-y pixel array that has been captured or generated by a CT scanner. As another non-limiting example, the trained deep learning neural network 104 can be configured to operate on x-by-y-by-z voxel arrays that are captured or generated by an MRI scanner. In such case, each of the set of training images 202 can be an x-by-y-by-z voxel array that has been captured or generated by an MRI scanner.

In some aspects, the training dataset 106 can be annotated. In such cases, as shown, the training dataset 106 can comprise a set of ground-truth annotations 204. In various instances, the set of ground-truth annotations 204 can respectively correspond (e.g., in one-to-one fashion) to the set of training images 202. Accordingly, since the set of training images 202 can comprise n images, the set of ground-truth annotations 204 can comprise n annotations: a ground-truth annotation 204(1) to a ground-truth annotation 204(n). In various aspects, each of the set of ground-truth annotations 204 can be considered as indicating or representing a correct or accurate inferencing task result for a respective one of the set of training images 202. As a non-limiting example, the ground-truth annotation 204(1) can correspond to the training image 202(1). Thus, the ground-truth annotation 204(1) can be any suitable electronic data that indicates, represents, or otherwise conveys a correct or accurate inferencing task result (e.g., correct or accurate classification label, correct or accurate segmentation mask, correct or accurate regression output) that is known or deemed to correspond to the training image 202(1). As another non-limiting example, the ground-truth annotation 204(n) can correspond to the training image 202(n). So, the ground-truth annotation 204(n) can be any suitable electronic data that indicates, represents, or otherwise conveys a correct or accurate inferencing task result that is known or deemed to correspond to the training image 202(n).

In situations where the training dataset 106 is annotated as shown in FIG. 2, the trained deep learning neural network 104 can have previously undergone supervised training with respect to the training dataset 106 (e.g., its trainable internal parameters can be randomly initialized, it can be iteratively executed on the set of training images 202, and its trainable internal parameters can be iteratively updated by backpropagating errors between the outputs it produced during training and the set of ground-truth annotations 204). Such training can have involved any suitable error or objective function (e.g., cross-entropy), any suitable optimization algorithm (e.g., stochastic gradient descent), any suitable number of training epochs, or any suitable training batch sizes.

However, this is a mere non-limiting example of how the trained deep learning neural network 104 can be trained. In other cases, the training dataset 106 can be unannotated (e.g., the set of ground-truth annotations 204 can be omitted, unavailable, or unknown). In such cases, the trained deep learning neural network 104 can be trained in unsupervised fashion or in reinforcement learning fashion.

Referring back to FIG. 1, the trained deep learning neural network 104 can, after having been trained on the training dataset 106, be deployed in the field. In various aspects, the failure image 108 can be any suitable image which can have the same format, size, dimensionality, or modality as each of the set of training images 202, which the trained deep learning neural network 104 has encountered in the field, and on which the trained deep learning neural network 104 is known or deemed to have incorrectly performed the inferencing task, hence the term "failure". That is, the trained deep learning neural network 104 can be executed on the failure image 108, thereby yielding an inferencing task result for the failure image 108, and a user or technician associated with the trained deep learning neural network 104 can indicate (e.g., via any suitable human-computer interface device, such as a keyboard, keypad, or touchscreen) that such inferencing task result is incorrect or inaccurate.

In various aspects, the failure image 108 can exhibit any suitable visual variety or style. In various instances, the visual variety/style of the failure image 108 can encompass any difficult-to-define visual qualities, attributes, or characteristics of the failure image 108 that materially affect the appearance of the failure image 108 (e.g., that materially affect how the visual content of the failure image 108 appears). Non-limiting examples of such difficult-to-define visual qualities, attributes, or characteristics can include a visual texture of the failure image 108; a visual contrast of the failure image 108; a visual color scheme or shading scheme of the failure image 108; a visual opaqueness, cloudiness, or translucency of the failure image 108; a visual sharpness or resolution of the failure image 108; or other visual patterns by which or through which the failure image 108 depicts, illustrates, or conveys its visual content.

In various cases, the visual variety/style of the failure image 108 can be subtly or non-subtly different or dissimilar from those of the set of training images 202. Accordingly, it can be assumed that the trained deep learning neural network 104 incorrectly or inaccurately performed the inferencing task on the failure image 108, due to the visual variety/style of the failure image 108 being outside the visual variety/style scope defined by the training dataset 106. Non-limiting aspects are described with respect to FIG. 3.

Figure 3:
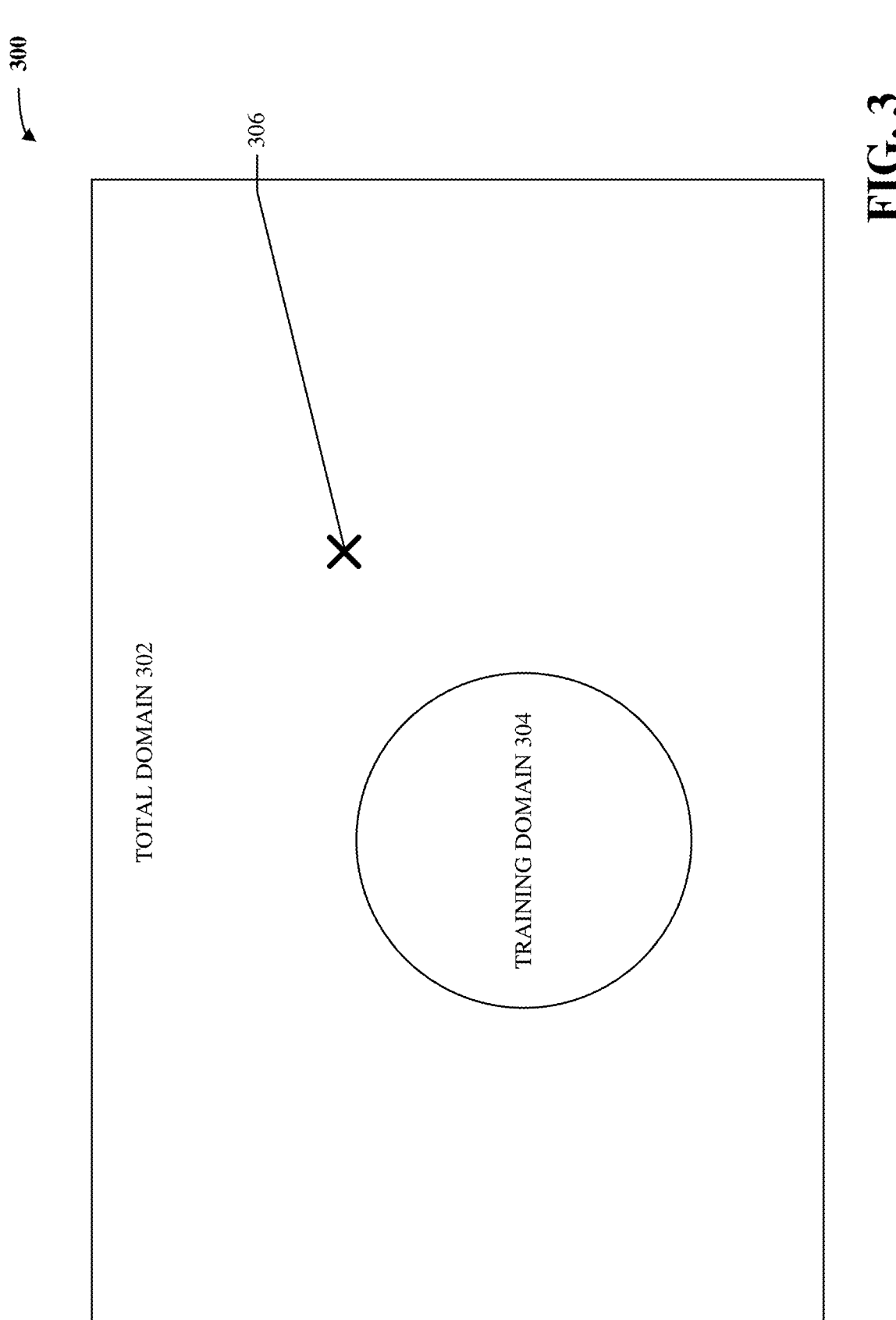
FIG. 3 illustrates an example, non-limiting block diagram conceptually showing in-scope and out-of-scope deep learning domains in accordance with one or more embodiments described herein.

FIG. 3 illustrates an example, non-limiting block diagram 300 conceptually showing in-scope and out-of-scope deep learning domains in accordance with one or more embodiments described herein.

As shown, numeral 302 can be considered as conceptually representing a total domain or scope of characteristics (e.g., content-style combinations) that can be exhibited by an image. In various aspects, numeral 304 can be considered as conceptually representing whatever subset of that total domain is actually exhibited by the training dataset 106 (e.g., by the set of training images 202). Thus, if an image exhibits characteristics that are within the subset denoted by the numeral 304, the trained deep learning neural network 104 can be expected to accurately, correctly, or reliably perform the inferencing task on that image. In contrast, if an image exhibits characteristics that are outside of the subset denoted by the numeral 304, the trained deep learning neural network 104 cannot be expected to accurately, correctly, or reliably perform the inferencing task on that image. In various cases, numeral 306 can be considered as conceptually representing the failure image 108. As mentioned above, the visual variety/style of the failure image 108 can be different or otherwise dissimilar in some way to the visual varieties/ styles of the set of training images 202. Thus, as shown, the numeral 306 can be outside (e.g., out of scope) of the training domain denoted by the numeral 304.

In any case, it can be assumed that the trained deep learning neural network 104 is not robust or agnostic to the visual variety/style of the failure image 108. Accordingly, in various aspects, it can be desired to synthesize new training images that can be used to improve the robustness of the trained deep learning neural network 104 with respect to the visual variety/style of the failure image 108. As described herein, the variety discovery system 102 can facilitate such synthesis.

Referring back to FIG. 1, in various embodiments, the variety discovery system 102 can comprise a processor 110 (e.g., computer processing unit, microprocessor) and a non-transitory computer-readable memory 112 that is operably or operatively or communicatively connected or coupled to the processor 110. The non-transitory computer-readable memory 112 can store computer-executable instructions which, upon execution by the processor 110, can cause the processor 110 or other components of the variety discovery system 102 (e.g., access component 114, variety component 116, conversion component 118, fine-tuning component 120) to perform one or more acts. In various embodiments, the non-transitory computer-readable memory 112 can store computer-executable components (e.g., access component 114, variety component 116, conversion component 118, fine-tuning component 120), and the processor 110 can execute the computer-executable components.

In various embodiments, the variety discovery system 102 can comprise an access component 114. In various aspects, the access component 114 can electronically receive or otherwise electronically access the trained deep learning neural network 104, the training dataset 106, or the failure image 108. In various instances, the access component 114 can electronically retrieve the trained deep learning neural network 104, the training dataset 106, or the failure image 108 from any suitable centralized or decentralized data structures (not shown) or from any suitable centralized or decentralized computing devices (not shown). In any case, the access component 114 can electronically obtain or access the trained deep learning neural network 104, the training dataset 106, or the failure image 108, such that other components of the variety discovery system 102 can electronically interact with the trained deep learning neural network 104, with the training dataset 106, or with the failure image 108.

In various embodiments, the variety discovery system 102 can comprise a variety component 116. In various aspects, as described herein, the variety component 116 can train another deep learning neural network to learn or discover the visual variety/style of the failure image 108.

In various embodiments, the variety discovery system 102 can comprise a conversion component 118. In various instances, as described herein, the conversion component 118 can generate, via the another deep learning neural network that is trained by the variety component, a converted version of the training dataset 106, which converted version can exhibit the visual variety/style of the failure image 108.

In various embodiments, the variety discovery system 102 can comprise a fine-tuning component 120. In various cases, as described herein, the fine-tuning component 120 can retrain or fine-tune the trained deep learning neural network 104 on the converted version of the training dataset 106, thereby increasing the robustness of the trained deep learning neural network 104.

Figure 4:
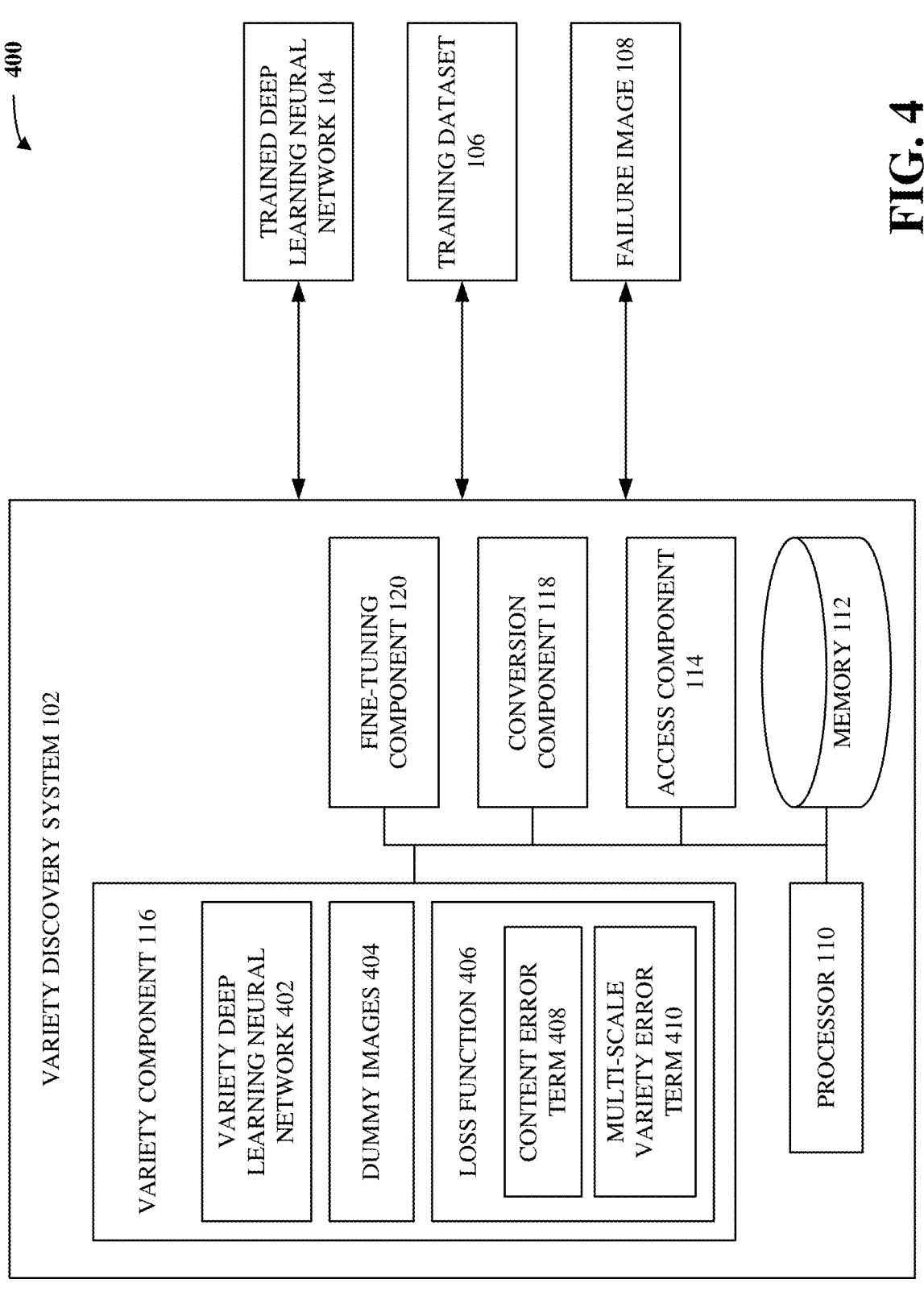
FIG. 4 illustrates a block diagram of an example, non-limiting system including a variety deep learning neural network, a set of dummy images, and a loss function that facilitates automatic image variety simulation for improved deep learning performance in accordance with one or more embodiments described herein.

FIG. 4 illustrates a block diagram of an example, non-limiting system 400 including a variety deep learning neural network, a set of dummy images, and a loss function that can facilitate automatic image variety simulation for improved deep learning performance in accordance with one or more embodiments described herein. As shown, the system 400 can, in some cases, comprise the same components as the system 100, and can further comprise a variety deep learning neural network 402, a set of dummy images 404, and a loss function 406.

In various embodiments, the variety component 116 can electronically store, electronically maintain, electronically control, or otherwise electronically access the variety deep learning neural network 402. In various aspects, the variety deep learning neural network 402 can be any suitable artificial neural network that can have or otherwise exhibit any suitable internal architecture. For instance, the variety deep learning neural network 402 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the variety component 116 can electronically train the variety deep learning neural network 402 to learn or otherwise discover the visual variety/style of the failure image 108. That is, the variety component 116 can train the variety deep learning neural network 402 to receive as input any given image and to produce as output a version of the given image, which version displays the same visual content of that given image, but which version exhibits the visual variety/style of the failure image 108. In various instances, the variety component 116 can facilitate such training, based on set of dummy images 404, and based on the loss function 406. In particular, the set of dummy images 404 can comprise any suitable number of images whose visual contents, visual varieties/styles, or modalities need not be related in any way to those of the failure image 108. Moreover, the loss function 406 can be any suitable mathematical expression that comprises a content error term 408 and a multi-scale variety error term 410. As described herein, the content error term 408 can help to cause the variety deep learning neural network 402 to preserve or maintain the visual contents of whatever images on which it is executed, whereas the multi-scale variety error term 410 can help to cause the variety deep learning neural network 402 to learn or discover the visual variety/style of the failure image 108. Non-limiting aspects are described with respect to FIGS. 5-11.

FIG. 5 illustrates an example, non-limiting block diagram 500 of the set of dummy images 404 in accordance with one or more embodiments described herein.

In various embodiments, as shown, the set of dummy images 404 can comprise m images, for any suitable positive integer m: a dummy image 404(1) to a dummy image 404(m). In various aspects, each of the set of dummy images 404 can be any suitable image whatsoever that has the same format, size, or dimensionality as the failure image 108 (e.g., if the failure image 108 is an x-by-y pixel array, then each dummy image can also be an x-by-y pixel array; if the failure image 108 is an x-by-y-by-z voxel array, then each dummy image can also be an x-by-y-by-z voxel array). Note that each of the set of dummy images 404 can be considered as having an unconstrained visual content, an unconstrained visual variety/style, or an unconstrained modality. In other words, for any given dummy image in the set of dummy images 404, that given dummy image can have or exhibit any suitable visual content whatsoever, any suitable visual variety/style whatsoever, or any suitable modality whatsoever, even if its content, variety/style, or modality are partially or completely unrelated to those of the failure image 108 (or those of the set of training images 202). In still other words, the given dummy image can have any randomly chosen visual content, any randomly chosen visual variety/style, or any randomly chosen modality.

As a non-limiting example, suppose that the failure image 108 (and each of the set of training images 202) is a CT scanned image that depicts a lung of a medical patient. In some cases, a dummy image can also be a CT scanned image that depicts a lung of some other medical patient. But this is not necessary. In other cases, a dummy image can be a CT scanned image that depicts some non-lung anatomical structure (e.g., an eye, a skull, a foot) of some other medical patient. In yet other cases, a dummy image can be a medical image depicting any suitable anatomical structure of some other medical patient and having some non-CT modality (e.g., can be an X-ray scanned image, an MRI scanned image, an ultrasound scanned image, a PET scanned image, or a visible-spectrum photograph). In even other cases, a dummy image need not be a medical image at all. Instead, a dummy image can be a scenic nature image that depicts flowers, trees, or some landscape. In still other cases, a dummy image can be an image of a family gathering or birthday party. In yet other cases, a dummy image can be an image from a cinematic movie or of a television character.

Note that, in various aspects, different ones of the set of dummy images 404 can have the same or different visual contents, the same or different visual varieties/styles, or the same or different modalities as each other.

In any case, the visual contents, the visual varieties/styles, and the modalities of the set of dummy images 404 can be considered as being unconstrained (e.g., as not having to satisfy any special criteria such as being related to the failure image 108), meaning that the set of dummy images 404 can be easily acquired without difficulty. Contrast this with specially-curated paired or unpaired images associated with existing deep learning techniques (e.g., unlike the set of dummy images 404, such specially-curated paired or unpaired images must be carefully selected, which can be time-consuming and costly).

In various aspects, the variety component 116 can electronically initialize in any suitable fashion (e.g., random initialization) the trainable internal parameters (e.g., weight matrices, bias values, convolutional kernels) of the variety deep learning neural network 402. After such initialization, the variety component 116 can electronically train the variety deep learning neural network 402 on the set of dummy images 404, as described with respect to FIGS. 6-11.

FIGS. 6-11 illustrate example, non-limiting block diagrams 600, 700, 800, 900, 1000, and 1100 showing how the variety deep learning neural network 402 can be trained on the set of dummy images 404 in accordance with one or more embodiments described herein.

Figure 6:
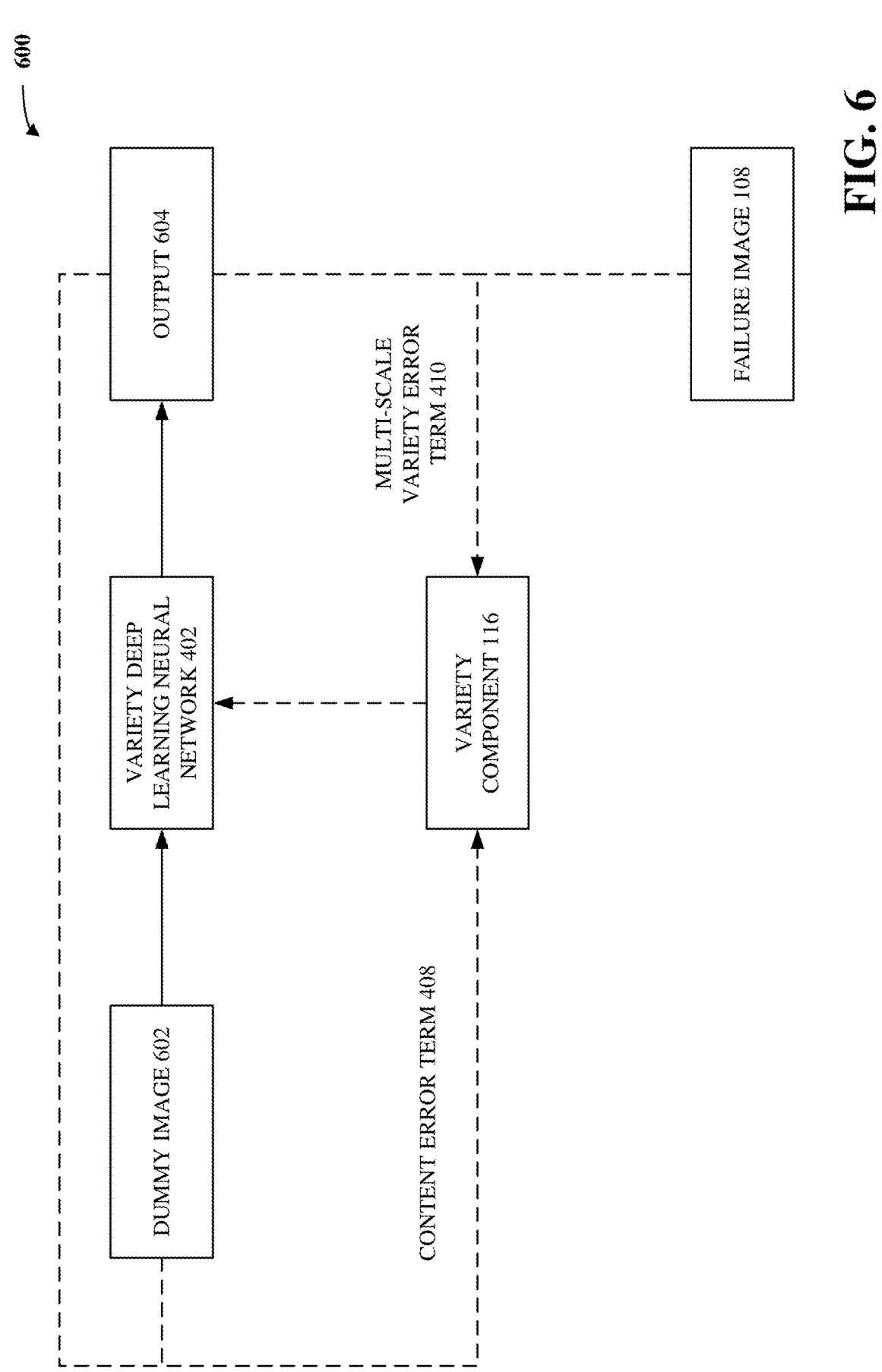

First, consider FIG. 6. In various embodiments, the variety component 116 can electronically select any dummy image from the set of dummy images 404. That selected dummy image can be referred to as a dummy image 602.

In various instances, the variety component 116 can execute the variety deep learning neural network 402 on the dummy image 602. In various instances, this can cause the variety deep learning neural network 402 to produce an output 604. More specifically, the variety component 116 can feed the dummy image 602 to an input layer of the variety deep learning neural network 402. In various cases, the dummy image 602 can complete a forward pass through one or more hidden layers of the variety deep learning neural network 402. Accordingly, an output layer of the variety deep learning neural network 402 can compute or calculate the output 604 based on activation maps produced by the one or more hidden layers of the variety deep learning neural network 402.

Note that, in various cases, the format, size, or dimensionality of the output 604 can be controlled or otherwise determined by the number, arrangement, or sizes of neurons or other internal parameters (e.g., convolutional kernels) that are contained in or that otherwise make up the output layer (or any other layers) of the variety deep learning neural network 402. That is, the output 604 can be forced to have any desired format, size, or dimensionality by adding, removing, or otherwise adjusting neurons or other internal parameters to, from, or within the output layer (or any other suitable layers) of the variety deep learning neural network

402. Thus, in various aspects, the output 604 can be forced to have the same format, size, or dimensionality as the dummy image 602.

In any case, the output 604 can be considered as being an inferred or predicted image that is supposed to have the same visual content as the dummy image 602 and that is supposed to have the visual variety/style of the failure image 108. In other words, the output 604 can be considered as a transformed version of the dummy image 602 that is predicted or inferred by the variety deep learning neural network 402. Note that, if the variety deep learning neural network 402 has so far undergone no or little training, then the output 604 can be highly inaccurate (e.g., the output 604 can appear to be visual gibberish that does not accurately convey the visual content of the dummy image 602 according to the visual variety/style of the failure image 108).

In various aspects, the variety component 116 can compute the content error term 408, based on the output 604 and based on the dummy image 602. In various instances, the content error term 408 can be any suitable mathematical expression or formula that can capture or otherwise quantify a difference, distinction, or dissimilarity between whatever visual content is shown in the output 604 and whatever visual content is shown in the dummy image 602. As a non-limiting example, the content error term 408 can be equal to or otherwise based on a mean absolute error (MAE) between the dummy image 602 and the output 604. As another non-limiting example, the content error term 408 can be equal to or otherwise based on a mean squared error (MSE) between the dummy image 602 and the output 604. As even another non-limiting example, the content error term 408 can be equal to or otherwise based on a cross-entropy error between the dummy image 602 and the output 604.

In various aspects, the variety component 116 can compute the multi-scale variety error term 410, based on the output 604 and based on the failure image 108. In various instances, the multi-scale variety error term 410 can be any suitable mathematical expression or formula that can capture or otherwise quantify a difference, distinction, or dissimilarity between whatever visual variety/style is exhibited by the output 604 and the visual variety/style that is exhibited by the failure image 108. In various cases, the multi-scale variety error term 410 can be equal to or otherwise based on an aggregation of region-wise Gram matrix differences that are computed between the output 604 and the failure image 108 across multiple different image scales. Non-limiting aspects are described with respect to FIGS. 7-11.

Figure 7:
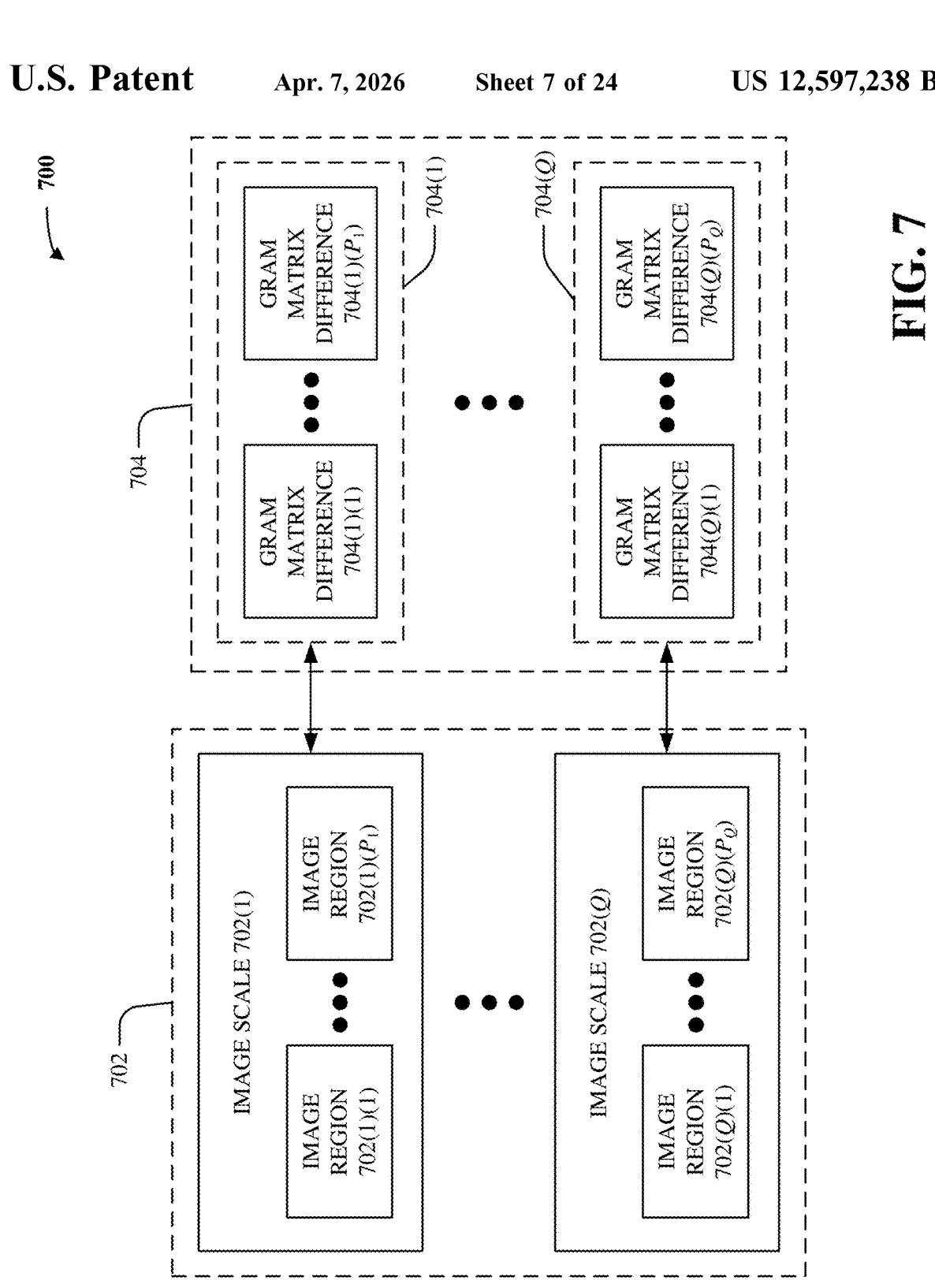

First, consider FIG. 7. As shown, there can be a plurality of image scales 702. In various aspects, the plurality of image scales 702 can comprise q scales, for any suitable positive integer q: an image scale 702(1) to an image scale 702($q$). In various instances, each of the plurality of image scales 702 can be considered as defining respective image regions into which any given image can be divided or decomposed.

As a non-limiting example, the image scale 702(1) can define a total of $p_1$ regions, for any suitable positive integer $p_1$: an image region 702(1)(1) to an image region 702(1)($p_1$). In various aspects, for any given image, the $p_1$ image regions of the image scale 702(1) can be considered as denoting or defining $p_1$ sub-images or fragments of that given image, where such $p_1$ sub-images or fragments can be disjoint with each other, and where such $p_1$ sub-images or fragments can collectively form or make up the given image. In other words, the image region 702(1)(1) to the image region 702(1)($p_1$) can be considered as defining $p_1$ distinct puzzle pieces into which any given image can be broken. That is, the image region $702(1)(1)$ can define, delineate, or demarcate a first puzzle piece (e.g., a first contiguous subset of the pixels or voxels) of the given image, whereas the image region $702(1)(p_1)$ can define, delineate, or demarcate a $p_1$-th puzzle piece (e.g., a $p_1$-th contiguous subset of the pixels or voxels) of the given image. In still other words, the $p_1$ image regions defined by the image scale $702(1)$ can be analogous to the discrete compartments of a brownie-cutter tool. So, if that brownie-cutter tool were placed over top of the given image, the image region $702(1)(1)$ could be considered as a first discrete compartment of the brownie-cutter tool that cuts out a first fragment from the given image, and the image region $702(1)(p_1)$ could be considered as a $p_1$-th discrete compartment of the brownie-cutter tool that cuts out a $p_1$-th fragment from the given image. In various cases, note that different image regions of the image scale $702(1)$ can have the same or different sizes or shapes as each other (e.g., the image region $702(1)(1)$ can have more or fewer pixels or voxels, or a differently-shaped arrangement of pixels or voxels, than the image region $702(1)(p_1)$).

As another non-limiting example, the image scale $702(q)$ can define a total of $p_q$ regions, for any suitable positive integer $p_q$: an image region $702(q)(1)$ to an image region $702(q)(p_q)$. In various aspects, for any given image, the $p_q$ image regions of the image scale $702(q)$ can be considered as $p_q$ sub-images or fragments of that given image, where such $p_q$ sub-images or fragments can be disjoint with each other, and where such $p_q$ sub-images or fragments can collectively form or make up the given image. That is, the image region $702(q)(1)$ to the image region $702(q)(p_q)$ can be considered as $p_q$ distinct puzzle pieces into which any given image can be broken. So, the image region $702(q)(1)$ can be a first puzzle piece (e.g., a first contiguous subset of the pixels or voxels) of the given image, whereas the image region $702(q)(p_q)$ can be a $p_q$-th puzzle piece (e.g., a $p_q$-th contiguous subset of the pixels or voxels) of the given image. As above, the $p_q$ image regions of the image scale $702(q)$ can be analogous to the discrete compartments of a brownie-cutter tool. So, if that brownie-cutter tool were placed over top of the given image, the image region $702(q)(1)$ could be considered as a first discrete compartment of the brownie-cutter tool that cuts out a first fragment from the given image, and the image region $702(q)(p_q)$ could be considered as a $p_q$-th discrete compartment of the brownie-cutter tool that cuts out a $p_q$-th fragment from the given image. Just as above, note that different image regions defined by the image scale $702(q)$ can have the same or different sizes or shapes as each other (e.g., the image region $702(q)(1)$ can have more or fewer pixels or voxels, or a differently-shaped arrangement of pixels or voxels, than the image region $702(q)(p_q)$).

In various aspects, the plurality of image scales $702$ can be progressively or increasingly granular. In other words, for any positive integers i and j where $1 \leq i < j \leq q$, it can be the case that $1 \leq p_i < p_j$. In still other words, any given image scale in the plurality of image scales $702$ can be considered as defining more, and thus generally smaller or more granular, image regions than any preceding image scale.

In various instances, the variety component $116$ can decompose or fragment the output $604$ and the failure image $108$ according to the plurality of image scales $702$, and the variety component $116$ can compute a plurality of sets of Gram matrix differences $704$ based on such decomposition or fragmentation.

As a non-limiting example, the variety component $116$ can decompose the failure image $108$ according to the image scale $702(1)$. That is, the variety component $116$ can decompose the failure image $108$ into a total of $p_1$ fragments: a first fragment corresponding to (e.g., whose size, shape, or location is determined by) the image region $702(1)(1)$, to a $p_1$-th fragment corresponding to (e.g., whose size, shape, or location is determined by) the image region $702(1)(p_1)$. Likewise, the variety component $116$ can decompose the output $604$ according to the image scale $702(1)$. So, the variety component $116$ can decompose the output $604$ into a total of $p_1$ fragments: a first fragment corresponding to the image region $702(1)(1)$, to a $p_1$-th fragment corresponding to the image region $702(1)(p_1)$.

Now, in various aspects, the variety component $116$ can compute a total of $p_1$ Gram matrix differences, based on those $p_1$ fragments of the failure image $108$ and based on those $p_1$ fragments of the output $604$. Such $p_1$ Gram matrix differences can be considered as being computed at the image scale $702(1)$ and can be referred to as a set of Gram matrix differences $704(1)$.

In particular, the variety component $116$ can compute a Gram matrix difference $704(1)(1)$ between: whichever fragment or sub-image of the failure image $108$ corresponds to the image region $702(1)(1)$; and whichever fragment or sub-image of the output $604$ corresponds to the image region $702(1)(1)$. Note that the Gram matrix difference $704(1)(1)$ can be considered as measuring, capturing, or quantifying any visual variety/style dissimilarities (e.g., textural mismatches, contrast mismatches, sharpness mismatches, resolution mismatches, or other visual pattern mismatches) that are detectable between those two fragments. In like fashion, the variety component $116$ can compute a Gram matrix difference $704(1)(p_1)$ between: whichever fragment or sub-image of the failure image $108$ corresponds to the image region $702(1)(p_1)$; and whichever fragment or sub-image of the output $604$ corresponds to the image region $702(1)(p_1)$. As above, note that the Gram matrix difference $704(1)(p_1)$ can be considered as measuring, capturing, or quantifying any visual variety/style dissimilarities that are detectable between those two fragments.

As another non-limiting example, the variety component $116$ can decompose the failure image $108$ according to the image scale $702(q)$. That is, the variety component $116$ can decompose the failure image $108$ into a total of $p_q$ fragments: a first fragment corresponding to (e.g., whose size, shape, or location is determined by) the image region $702(q)(1)$, to a $p_q$-th fragment corresponding to (e.g., whose size, shape, or location is determined by) the image region $702(q)(p_q)$. Likewise, the variety component $116$ can decompose the output $604$ according to the image scale $702(q)$. So, the variety component $116$ can decompose the output $604$ into a total of $p_q$ fragments: a first fragment corresponding to the image region $702(q)(1)$, to a $p_q$-th fragment corresponding to the image region $702(q)(p_q)$.

Now, in various aspects, the variety component $116$ can compute a total of $p_q$ Gram matrix differences, based on those $p_q$ fragments of the failure image $108$ and based on those $p_q$ fragments of the output $604$. Such $p_q$ Gram matrix differences can be considered as being computed at the image scale $702(q)$ and can be referred to as a set of Gram matrix differences $704(q)$.

In particular, the variety component $116$ can compute a Gram matrix difference $704(q)(1)$ between: whichever fragment or sub-image of the failure image $108$ corresponds to the image region $702(q)(1)$; and whichever fragment or sub-image of the output $604$ corresponds to the image region $702(q)(1)$. Note that the Gram matrix difference $704(q)(1)$ can be considered as measuring, capturing, or quantifying any visual variety/style dissimilarities (e.g., textural mismatches, contrast mismatches, sharpness mismatches, resolution mismatches, or other visual pattern mismatches) that are detectable between those two fragments. In like fashion, the variety component 116 can compute a Gram matrix difference 704$(q)$(p$_q$) between: whichever fragment or sub-image of the failure image 108 corresponds to the image region 702$(q)$(p$_q$); and whichever fragment or sub-image of the output 604 corresponds to the image region 702$(q)$(p$_q$). As above, note that the Gram matrix difference 704$(q)$(p$_q$) can be considered as measuring, capturing, or quantifying any visual variety/style dissimilarities that are detectable between those two fragments.

In various cases, the set of Gram matrix differences 704(1) to the set of Gram matrix differences 704$(q)$ can be considered as collectively forming the plurality of sets of Gram matrix differences 704.

In this way, the variety component 116 can compute, across the plurality of image scales 702, the plurality of sets of Gram matrix differences 704 between the output 604 and the failure image 108. In some instances, each Gram matrix difference in the plurality of sets of Gram matrix differences 704 can be referred to as a region-wise Gram matrix difference, since its computation can depend upon the image regions defined by the plurality of image scales 702.

As mentioned above, it can be the case that $1 \leq p_i < p_j$, for any positive integers i and j where $1 \leq i < j \leq q$. Accordingly, the set of Gram matrix differences 704(1) can have a smaller cardinality than the set of Gram matrix differences 704$(q)$. Equivalently, each of the set of Gram matrix differences 704(1) can be considered as a numerical quantity that measures, captures, or quantifies a visual variety/style mismatch that is detectable between larger and thus less granular fragments/sub-images, whereas each of the set of Gram matrix differences 704$(q)$ can be considered as a numerical quantity that measures, captures, or quantifies a visual variety/style mismatch that is detectable between smaller and thus more granular fragments/sub-images. Due to such difference in granularity, the set of Gram matrix differences 704(1) can be considered as measuring, capturing, or quantifying large-scale manifestations of visual variety/style, whereas the set of Gram matrix differences 704$(q)$ can instead be considered as measuring, capturing, or quantifying small-scale manifestations of visual variety/style.

For illustrative clarity, consider FIGS. 8-11.

Figure 8:
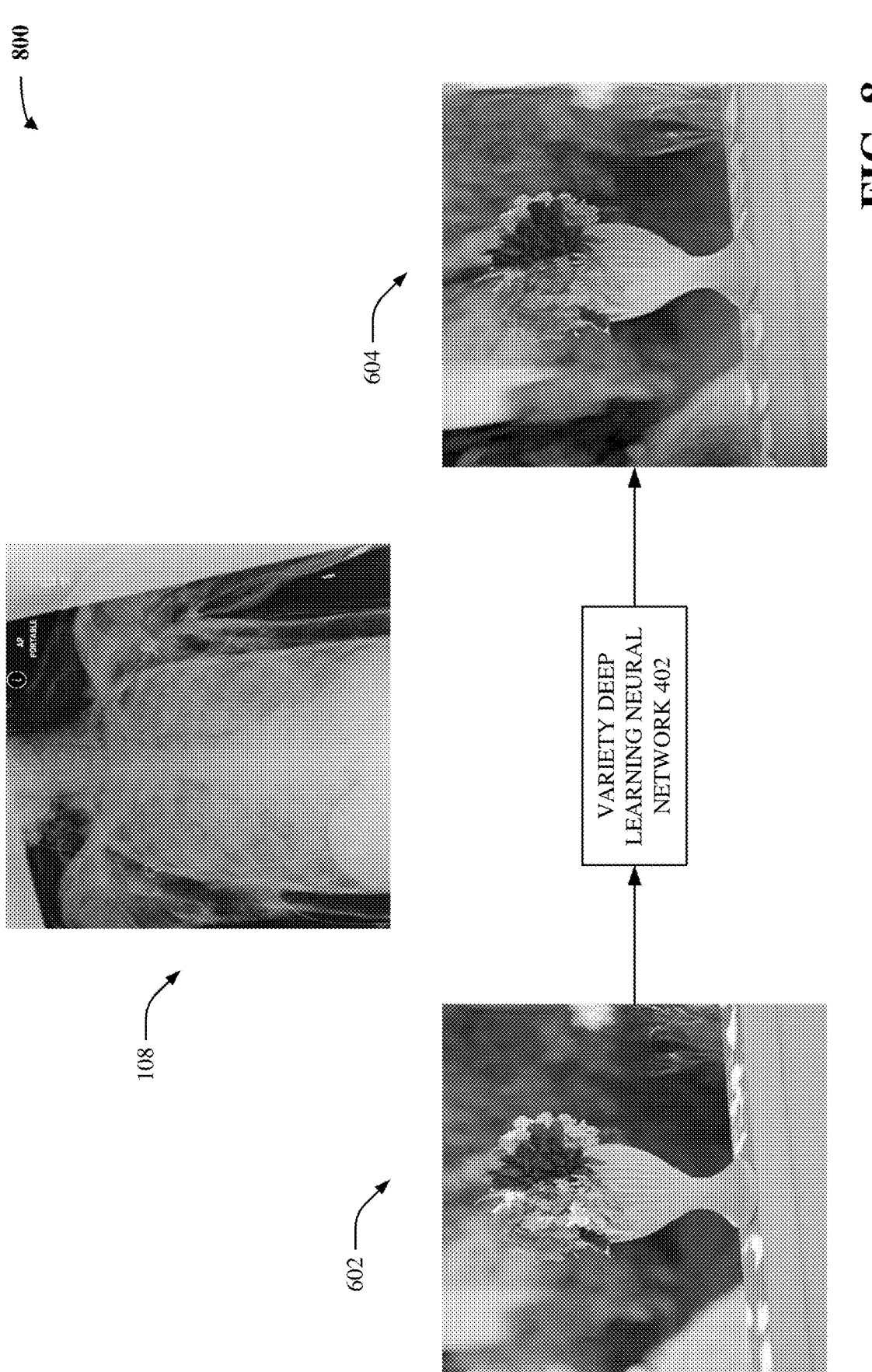

FIG. 8 shows non-limiting examples of the failure image 108, of the dummy image 602, and of the output 604. As shown, the failure image 108 can, in this non-limiting example, be an X-ray scanned image of a torso, the dummy image 602 can be a scenic nature image of flowers in a vase, and the output 604 can show a transformed version of those flowers and vase.

Figure 9:
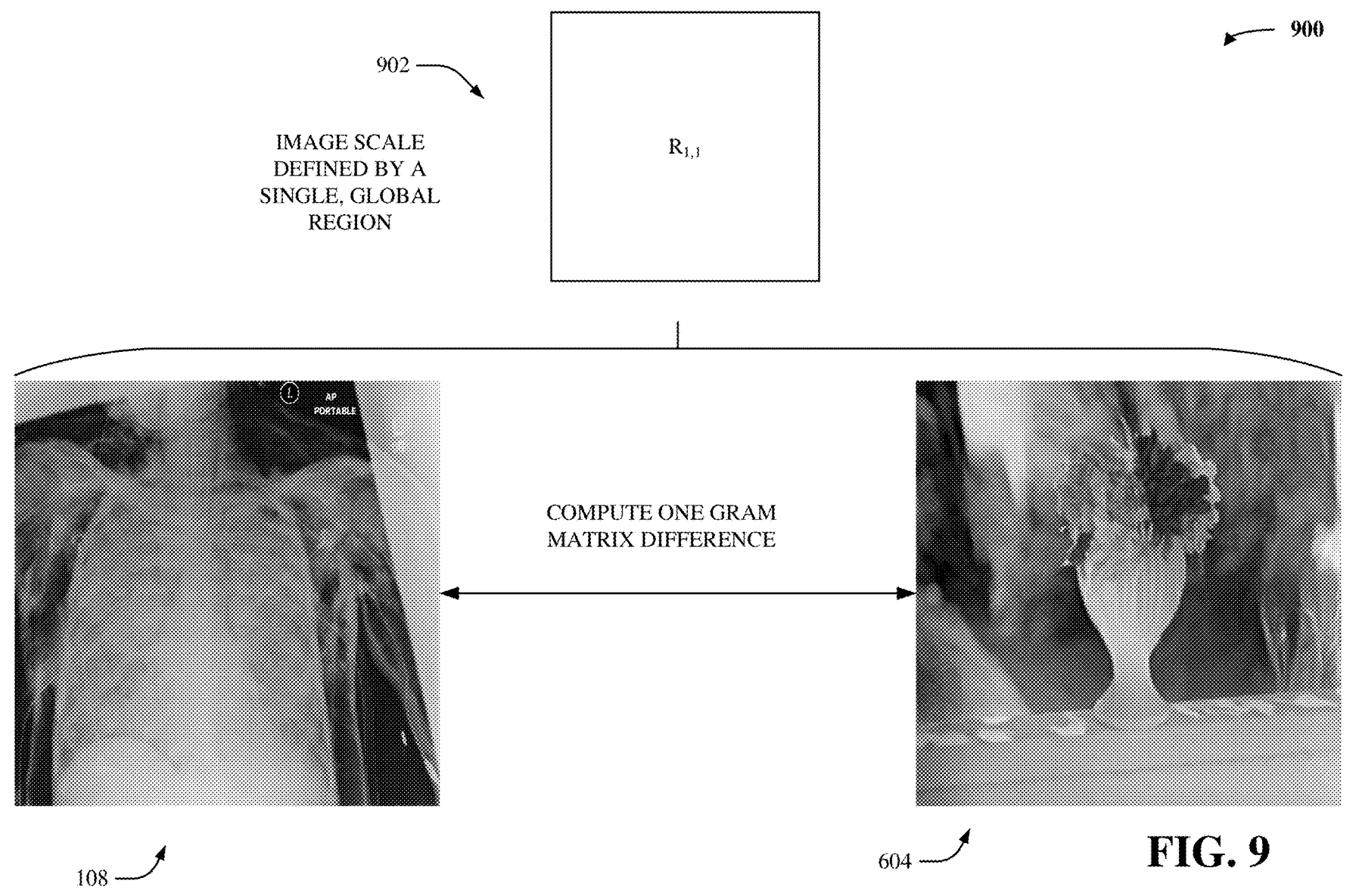

Now, FIG. 9 illustrates an image scale 902. In the non-limiting example of FIG. 9, the image scale 902 defines a single, global region, denoted as $r_{1,1}$. In other words, when given an image, that entire image can be considered as forming an image region according to the image scale 902. Thus, according to the image scale 902, the failure image 108 can itself be considered as one big region, and the output 604 can itself be considered as one big region. In various aspects, the variety component 116 can accordingly compute one Gram matrix difference between those two regions. That is, the variety component 116 can compute a Gram matrix difference between the entirety of the failure image 108 and the entirety of the output 604.

Figure 10:
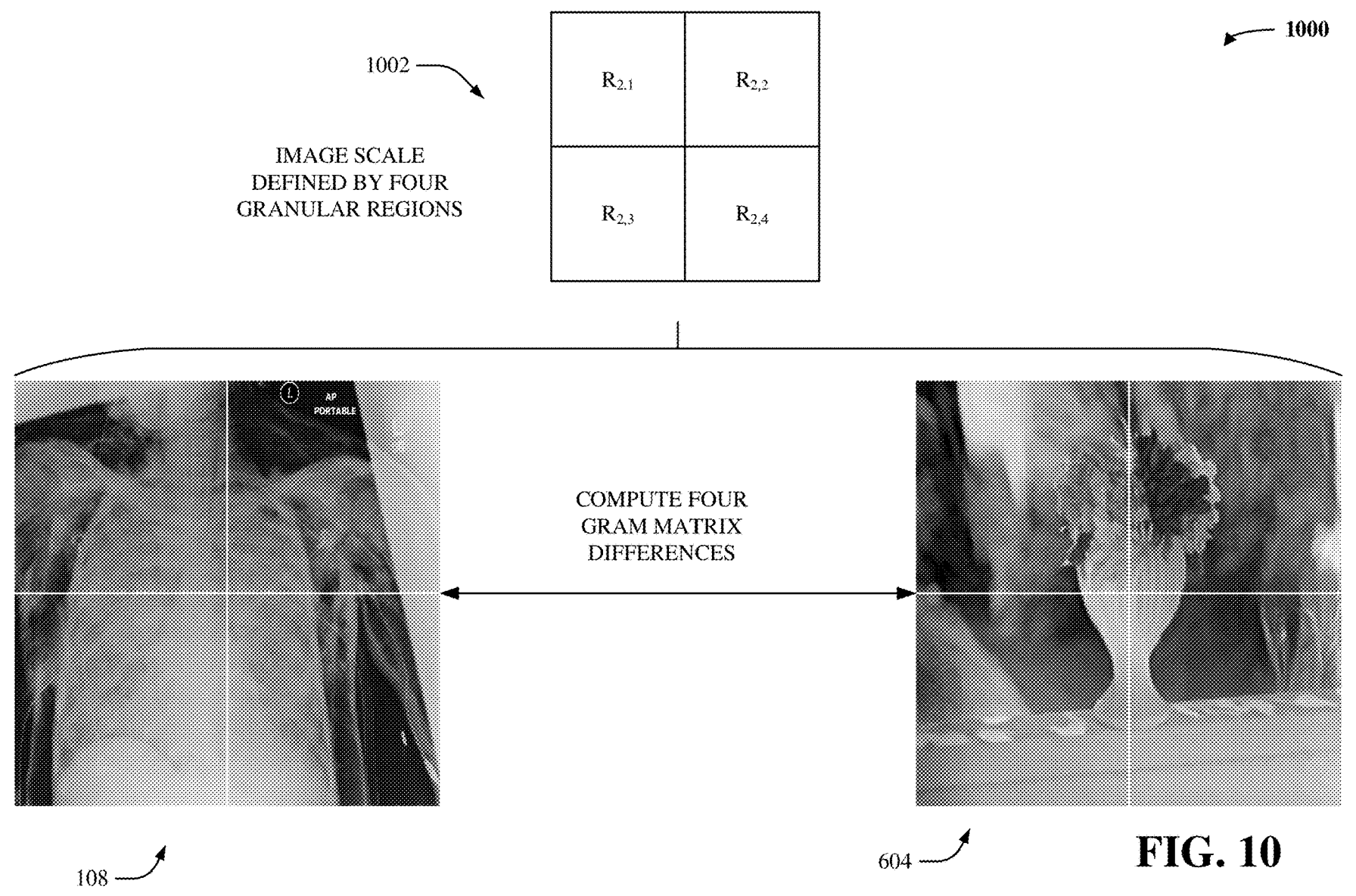

Now, FIG. 10 illustrates an image scale 1002. In the non-limiting example of FIG. 10, the image scale 1002 defines four granular regions, respectively denoted as $r_{2,1}$, $R_{2,2}$, $r_{2,3}$, and $r_{2,4}$. In the non-limiting example shown, when given any image, the region $r_{2,1}$ can be considered as defining a top-left quadrant of that given image, the region $r_{2,2}$ can be considered as defining a top-right quadrant of that given image, the region $r_{2,3}$ can be considered as defining a bottom-left quadrant of that given image, and the region $r_{2,4}$ can be considered as defining a bottom-right quadrant of that given image. Thus, according to the image scale 1002, the failure image 108 can be fragmented into a top-left quadrant, a top-right quadrant, a bottom-left quadrant, and a bottom-right quadrant; and the output 604 can likewise be fragmented into a top-left quadrant, a top-right quadrant, a bottom-left quadrant, and a bottom-right quadrant. In various aspects, the variety component 116 can accordingly compute four Gram matrix differences between those various regions. In particular, the variety component 116 can compute: a first Gram matrix difference between the top-left quadrant of the failure image 108 and the top-left quadrant of the output 604; a second Gram matrix difference between the top-right quadrant of the failure image 108 and the top-right quadrant of the output 604; a third Gram matrix difference between the bottom-left quadrant of the failure image 108 and the bottom-left quadrant of the output 604; and a fourth Gram matrix difference between the bottom-right quadrant of the failure image 108 and the bottom-right quadrant of the output 604.

Note how each of the four Gram matrix differences computed at the image scale 1002 can be considered as capturing or monitoring for more granular manifestations of variety/style, as compared to the one, global Gram matrix difference computed at the image scale 902. In other words, the four Gram matrix differences computed at the image scale 1002 can capture or quantify manifestations of variety/style that might not be capturable or quantifiable at less granular image scales.

Now, FIG. 11 illustrates an image scale 1102. In the non-limiting example of FIG. 11, the image scale 1102 defines sixteen even more granular regions, respectively denoted as $r_{3,1}$, $r_{3,2}$, $r_{3,3}$, $r_{3,4}$, $r_{3,5}$, $r_{3,6}$, $r_{3,7}$, $r_{3,8}$, $r_{3,9}$, $r_{3,10}$, $r_{3,11}$, $r_{3,12}$, $r_{3,13}$, $r_{3,14}$, $r_{3,15}$, and $r_{3,16}$. In the non-limiting example shown, when given any image, these sixteen regions can be considered as breaking up each quadrant of that given image into its own respective quadrants. In any case, according to the image scale 1102, the failure image 108 can be fragmented as shown into sixteen sub-images respectively corresponding to the sixteen regions defined by the image scale 1102, and the output 604 can be fragmented as shown into sixteen sub-images respectively corresponding to the sixteen regions defined by the image scale 1102. In various aspects, the variety component 116 can accordingly compute sixteen Gram matrix differences between those various regions. For example, the variety component 116 can compute a first Gram matrix difference between: whichever fragment of the failure image 108 corresponds to the region $r_{3,1}$; and whichever fragment of the output 604 corresponds to the region $r_{3,1}$. As another example, the variety component 116 can compute a sixteenth Gram matrix difference between: whichever fragment of the failure image 108 corresponds to the region $r_{3,16}$; and whichever fragment of the output 604 corresponds to the region $r_{3,16}$.

Note how each of the sixteen Gram matrix differences computed at the image scale 1102 can be considered as capturing or monitoring for even more granular manifestations of variety/style, as compared to the four Gram matrix differences computed at the image scale 1102, and as compared to the one, global Gram matrix difference computed at the image scale 902. In other words, the sixteen Gram matrix differences computed at the image scale 1102 can capture or quantify manifestations of variety/style that might not be capturable or quantifiable at less granular image scales.

Referring back to FIG. 6, the variety component 116 can, in various aspects, compute the multi-scale variety error term 410 based on the plurality of sets of Gram matrix differences 704. In particular, the multi-scale variety error term 410 can be equal to or otherwise based on any suitable aggregation of the plurality of sets of Gram matrix differences 704. As a non-limiting example, the multi-scale variety error term 410 can be equal to or otherwise based on an unweighted linear combination of the plurality of sets of Gram matrix differences 704. As another non-limiting example, the multi-scale variety error term 410 can be equal to or otherwise based on a weighted linear combination of the plurality of sets of Gram matrix differences 704. As even another non-limiting example, the multi-scale variety error term 410 can be equal to or otherwise based on an unweighted or weighted multiplicative combination of the plurality of sets of Gram matrix differences 704.

In any case, the variety component 116 can compute the content error term 408 and the multi-scale variety error term 410, as described above. In various aspects, the loss function 406 can be equal to or otherwise based on any suitable aggregation (e.g., weighted or unweighted linear or multiplicative combination) of the content error term 408 and of the multi-scale variety error term 410. In various aspects, the variety component 116 can incrementally update the trainable internal parameters (e.g., weight matrices, bias values, convolutional kernels) of the variety deep learning neural network 402, by performing backpropagation (e.g., stochastic gradient descent) driven by the loss function 406.

In various cases, the variety component 116 can repeat the above-described training procedure for each of the set of dummy images 404. Such repetition can cause the loss function 406, and thus both the content error term 408 and the multi-scale variety error term 410, to become reduced or otherwise minimized. In various instances, such reduction or minimization can cause the trainable internal parameters of the variety deep learning neural network 402 to become iteratively optimized for converting any inputted image to the visual variety/style of the failure image 108 (e.g., this can be caused by reduction or minimization of the multi-scale variety error term 410) while maintaining or preserving the visual content of that inputted image (e.g., which can be caused by reduction or minimization of the content error term 408). That is, such training can cause the variety deep learning neural network 402 to learn or discover the visual variety/style of the failure image 108. In various aspects, the variety component 116 can implement any suitable training batch sizes or any suitable training termination criterion when training the variety deep learning neural network 402.

Figure 12:
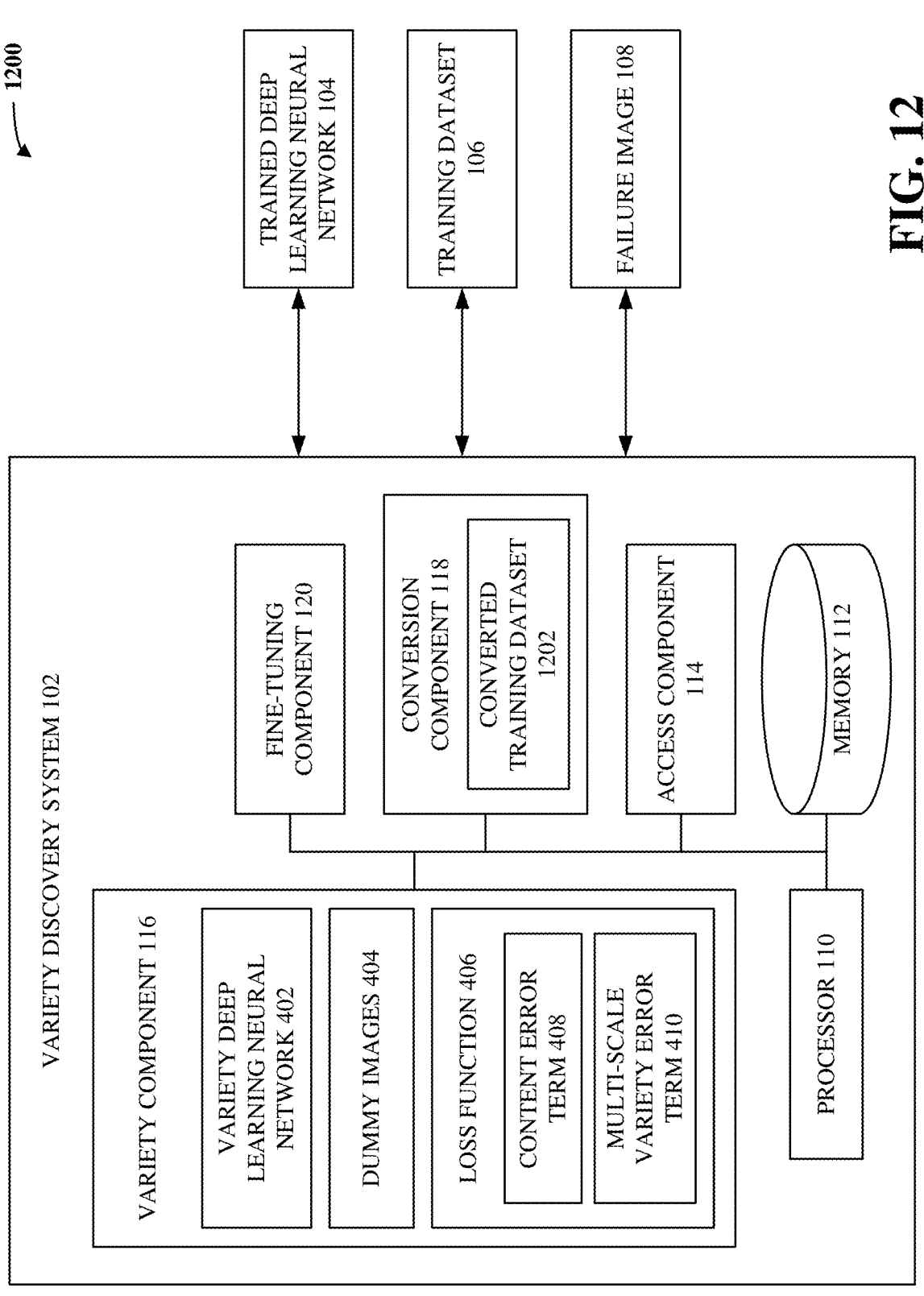
FIG. 12 illustrates a block diagram of an example, non-limiting system including a converted training dataset that facilitates automatic image variety simulation for improved deep learning performance in accordance with one or more embodiments described herein.

FIG. 12 illustrates a block diagram of an example, non-limiting system 1200 including a converted training dataset that facilitates automatic image variety simulation for improved deep learning performance in accordance with one or more embodiments described herein. As shown, the system 1200 can, in some cases, comprise the same components as the system 400, and can further comprise a converted training dataset 1202.

In various embodiments, the conversion component 118 can electronically generate the converted training dataset 1202, by executing the variety deep learning neural network 402 on the training dataset 106. Non-limiting aspects are described with respect to FIG. 13.

Figure 13:
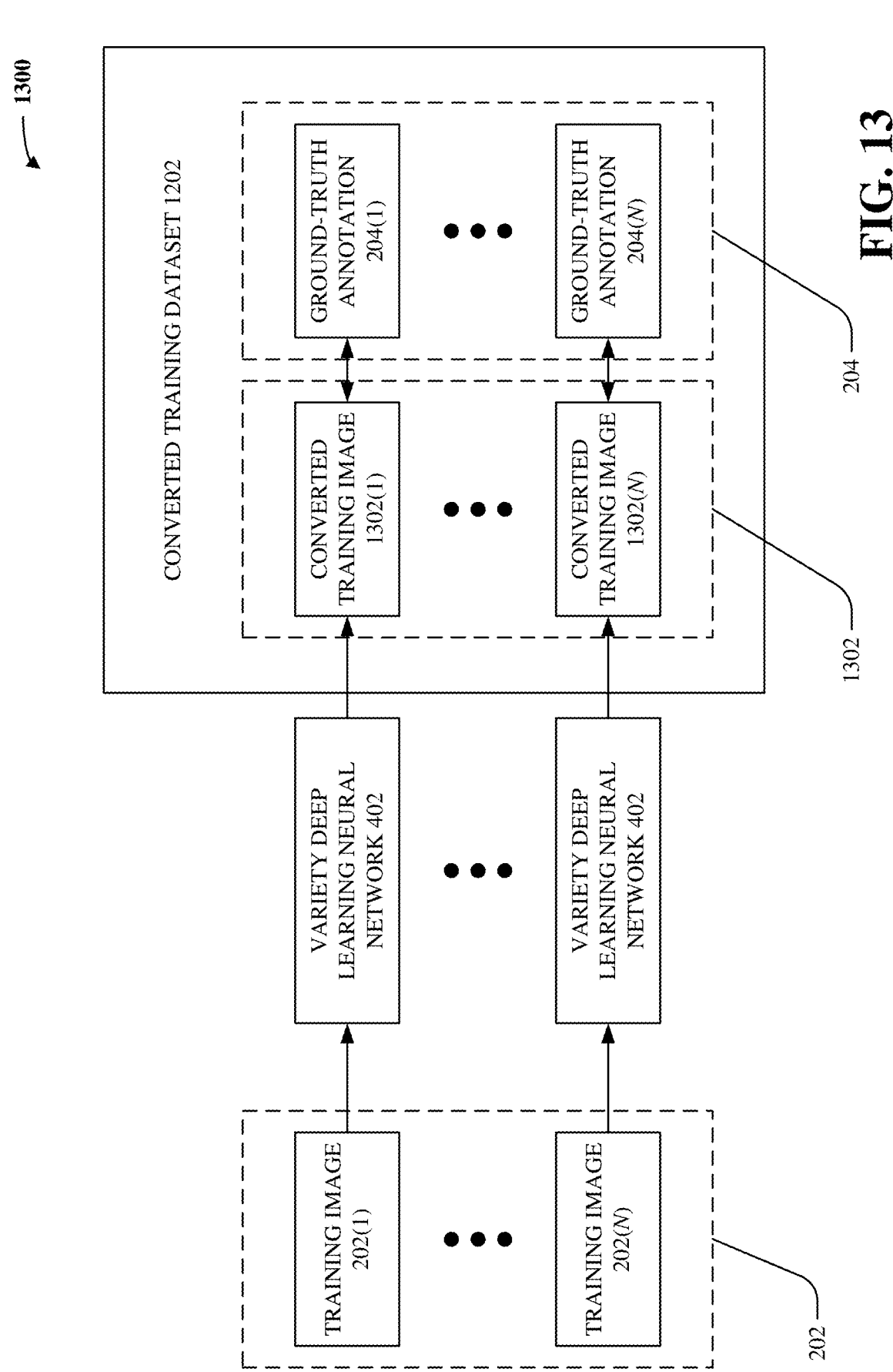
FIG. 13 illustrates an example, non-limiting block diagram of a converted training dataset in accordance with one or more embodiments described herein.

FIG. 13 illustrates an example, non-limiting block diagram 1300 of the converted training dataset 1202 in accordance with one or more embodiments described herein.

In various aspects, as shown, the converted training dataset 1202 can comprise a set of converted training images 1302. In various instances, the set of converted training images 1302 can respectively correspond to the set of training images 202. That is, since the set of training images 202 can comprise n images, the set of converted training images 1302 can likewise comprise n images: a converted training image 1302(1) to a converted training image 1302(n). In various cases, each of the set of converted training images 1302 can be considered as a version of a respective one of the set of training images 202 that exhibits the visual variety/style of the failure image 108.

As a non-limiting example, the conversion component 118 can electronically execute the variety deep learning neural network 402 (after being trained by the variety component 116) on the training image 202(1). Such execution can cause the variety deep learning neural network 402 to produce the converted training image 1302(1). More specifically, the conversion component 118 can feed the training image 202(1) to the input layer of the variety deep learning neural network 402, the training image 202(1) can complete a forward pass through the one or more hidden layers of the variety deep learning neural network 402, and the output layer of the variety deep learning neural network 402 can compute the converted training image 1302(1) based on activation maps provided by the one or more hidden layers of the variety deep learning neural network 402. Accordingly, the converted training image 1302(1) can be considered as an image having the same format, size, or dimensionality as the training image 202(1), having the same visual content as the training image 202(1), but having the visual variety/style of the failure image 108.

As another non-limiting example, the conversion component 118 can electronically execute the variety deep learning neural network 402 (after being trained by the variety component 116) on the training image 202(n). Such execution can cause the variety deep learning neural network 402 to produce the converted training image 1302(n). More specifically, the conversion component 118 can feed the training image 202(n) to the input layer of the variety deep learning neural network 402, the training image 202(n) can complete a forward pass through the one or more hidden layers of the variety deep learning neural network 402, and the output layer of the variety deep learning neural network 402 can compute the converted training image 1302(n) based on activation maps provided by the one or more hidden layers of the variety deep learning neural network 402. So, the converted training image 1302(n) can be considered as an image having the same format, size, or dimensionality as the training image 202(n), having the same visual content as the training image 202(n), but having the visual variety/style of the failure image 108.

Note that the set of ground-truth annotations 204 can be considered as being applicable to the set of converted training images 1302, since the set of converted training images 1302 have the same respective visual contents as the set of training images 202. As a non-limiting example, the ground-truth annotation 204(1) can, as mentioned above, be known or deemed to correspond to the training image 202(1). Since the converted training image 1302(1) can have the same visual content as the training image 202(1), the ground-truth annotation 204(1) can be considered as being equally applicable to the converted training image 1302(1) (e.g., as indicating the correct or accurate inferencing task result that would be obtained if the inferencing task were properly performed on the converted training image 1302 (1)). As another non-limiting example, the ground-truth annotation 204(*n*) can, as mentioned above, be known or deemed to correspond to the training image 202(*n*). Since the converted training image 1302(*n*) can have the same visual content as the training image 202(*n*), the ground-truth annotation 204(*n*) can be considered as being equally applicable to the converted training image 1302(*n*) (e.g., as indicating the correct or accurate inferencing task result that would be obtained if the inferencing task were properly performed on the converted training image 1302(*n*)).

FIGS. 14-16 illustrate non-limiting examples of real-world X-ray images that are respectively fed to and produced by a reduced-to-practice embodiment of the variety deep learning neural network 402. Indeed, a version of the variety deep learning neural network 402 was trained on scenic nature images to learn the visual variety/style of the failure image 108 that is depicted in FIGS. 8-11.

FIG. 14 shows an X-ray scanned image 1402 that was fed to that version of the variety deep learning neural network 402, and FIG. 14 also shows a converted image 1404 that was synthesized by that version of the variety deep learning neural network 402 based on the X-ray scanned image 1402.

Likewise, FIG. 15 shows an X-ray scanned image 1502 that was fed to that version of the variety deep learning neural network 402, and FIG. 15 also shows a converted image 1504 that was synthesized by that version of the variety deep learning neural network 402 based on the X-ray scanned image 1502.

Similarly, FIG. 16 shows an X-ray scanned image 1602 that was fed to that version of the variety deep learning neural network 402, and FIG. 16 also shows a converted image 1604 that was synthesized by that version of the variety deep learning neural network 402 based on the X-ray scanned image 1602.

In various embodiments, the conversion component 118 can perform a type of sanity check to verify or confirm whether or not the variety deep learning neural network 402 properly learned the visual variety/style of the failure image 108. Non-limiting aspects are described with respect to FIG. 17.

Figure 17:
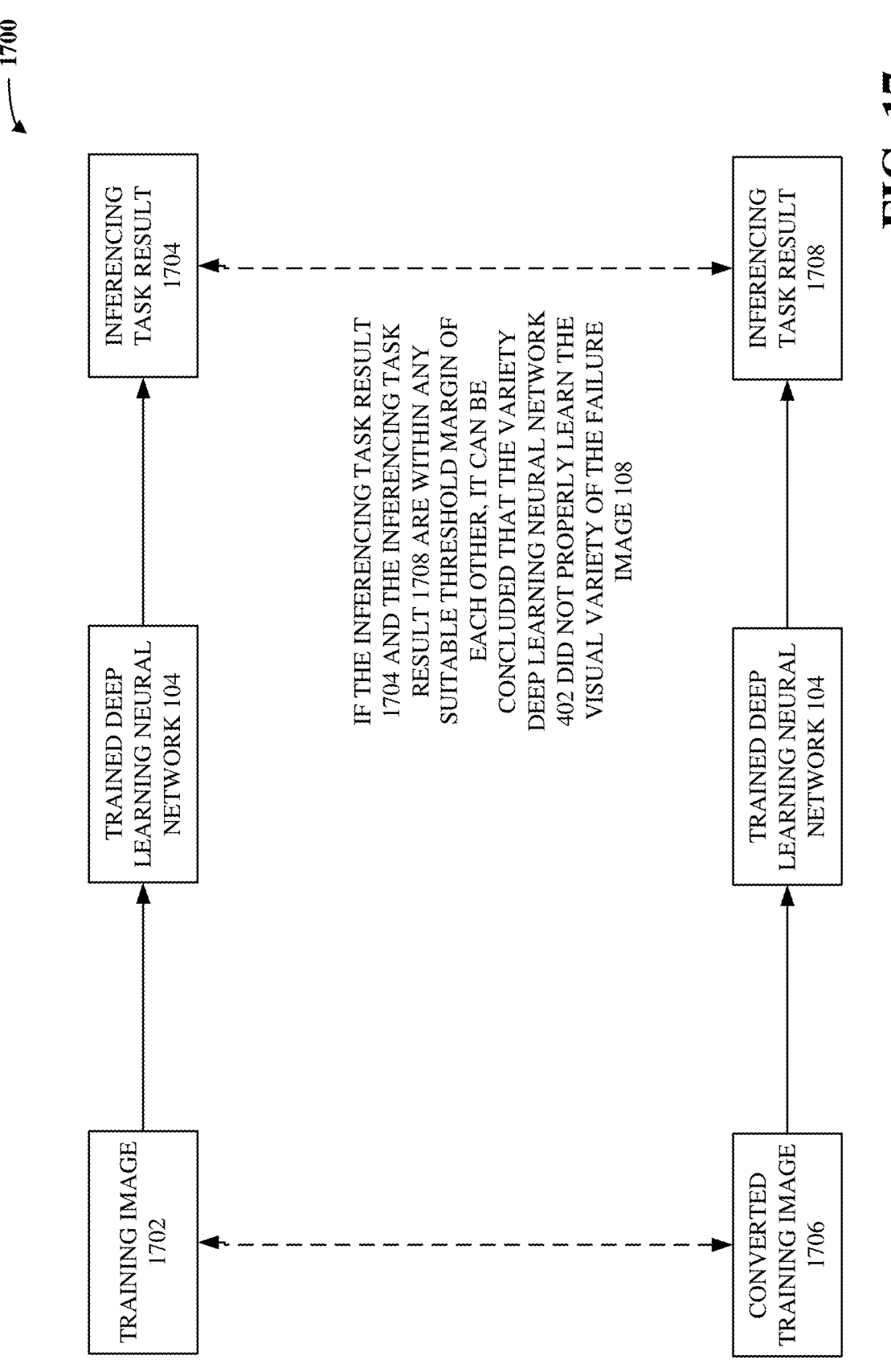
FIG. 17 illustrates an example, non-limiting block diagram showing how a variety deep learning neural network can be verified in accordance with one or more embodiments described herein.

FIG. 17 illustrates an example, non-limiting block diagram 1700 showing how the variety deep learning neural network 402 can be verified or checked in accordance with one or more embodiments described herein.

In various aspects, the conversion component 118 can select any one of the set of training images 202. Such selected training image can be referred to as a training image 1702. In various instances, the conversion component 118 can electronically execute the trained deep learning neural network 104 on the training image 1702. In various cases, such execution can cause the trained deep learning neural network 104 to produce an inferencing task result 1704. More specifically, the conversion component 118 can feed the training image 1702 to an input layer of the trained deep learning neural network 104, the training image 1702 can complete a forward pass through one or more hidden layers of the trained deep learning neural network 104, and an output layer of the trained deep learning neural network 104 can compute the inferencing task result 1704 based on activation maps provided by the one or more hidden layers of the trained deep learning neural network 104. So, the inferencing task result 1704 can be considered as whatever classification label, segmentation mask, or regression output that the trained deep learning neural network 104 has predicted for the training image 1702.

As mentioned above, one of the set of converted training images 1302 can correspond to the training image 1702. That converted training image can be referred to as a converted training image 1706. Thus, the converted training image 1706 can be generated by the variety deep learning neural network 402 based on the training image 1702. In other words, the converted training image 1706 can depict the visual content of the training image 1702, purportedly according to the visual variety/style of the failure image 108. In various aspects, the conversion component 118 can electronically execute the trained deep learning neural network 104 on the converted training image 1706. In various cases, such execution can cause the trained deep learning neural network 104 to produce an inferencing task result 1708. More specifically, the conversion component 118 can feed the converted training image 1706 to the input layer of the trained deep learning neural network 104, the converted training image 1706 can complete a forward pass through the one or more hidden layers of the trained deep learning neural network 104, and the output layer of the trained deep learning neural network 104 can compute the inferencing task result 1708 based on activation maps provided by the one or more hidden layers of the trained deep learning neural network 104. So, the inferencing task result 1708 can be considered as whatever classification label, segmentation mask, or regression output that the trained deep learning neural network 104 has predicted for the converted training image 1706.

Now, if the variety deep learning neural network 402 properly learned the visual variety/style of the failure image 108, then it can be expected that the inferencing task result 1708 is dissimilar to the inferencing task result 1704 by more than any suitable threshold margin. Accordingly, the conversion component 118 can compute any suitable error (e.g., MAE, MSE, cross-entropy) between the inferencing task result 1704 and the inferencing task result 1708. If that error is greater than the threshold margin, the conversion component 118 can conclude that the trained deep learning neural network 104 was thrown off or distracted by whatever visual variety/style is exhibited by the converted training image 1706, which can be considered as circumstantial evidence that the variety deep learning neural network 402 properly learned the visual variety/style of the failure image 108. On the other hand, if that error is lesser than the threshold margin, the conversion component 118 can conclude that the trained deep learning neural network 104 was not thrown off or distracted by whatever visual variety/style is exhibited by the converted training image 1706, which can be considered as circumstantial evidence that the variety deep learning neural network 402 did not properly learn the visual variety/style of the failure image 108. In such case, the conversion component 118 can cause the variety component 116 to perform additional training on the variety deep learning neural network 402.

In various embodiments, the fine-tuning component 120 can retrain (e.g., fine-tune) the trained deep learning neural network 104, based on the converted training dataset 1202. Non-limiting aspects are described with respect to FIG. 18.

FIG. 18 illustrates an example, non-limiting block diagram 1800 showing how the trained deep learning neural network 104 can be retrained or fine-tuned in accordance with one or more embodiments described herein.

In various aspects, the fine-tuning component 120 can combine the converted training dataset 1202 with the training dataset 106, thereby yielding a larger, aggregated training dataset. In various instances, the fine-tuning component 120 can retrain the trained deep learning neural network 104 based on such larger, aggregated training dataset. Such training can be facilitated as follows.

Note that, as mentioned above, the trained deep learning neural network 104 can have already undergone previous training with respect to the training dataset 106. Thus, the fine-tuning component 120 can refrain from re-initializing the trainable internal parameters (e.g., weight matrices, bias values, convolutional kernels) of the trained deep learning neural network 104.

In various aspects, the fine-tuning component 120 can select any image from the larger, aggregated training dataset (e.g., can select any image from the set of training images 202 or from the set of converted training images 1302). Such selected image can be referred to as an image 1802. In various cases, a ground-truth annotation 1804 can be which-ever one of the set of ground-truth annotations 204 corre-sponds to the image 1802. In various instances, the fine-tuning component 120 can electronically execute the trained deep learning neural network 104 on the image 1802. In various cases, such execution can cause the trained deep learning neural network 104 to produce an inferencing task result 1806. More specifically, the fine-tuning component 120 can feed the image 1802 to the input layer of the trained deep learning neural network 104, the image 1802 can complete a forward pass through the one or more hidden layers of the trained deep learning neural network 104, and the output layer of the trained deep learning neural network 104 can compute the inferencing task result 1806 based on activation maps provided by the one or more hidden layers of the trained deep learning neural network 104. So, the inferencing task result 1806 can be considered as whatever classification label, segmentation mask, or regression output that the trained deep learning neural network 104 has predicted for the image 1802.

In various aspects, the fine-tuning component 120 can compute an error or loss (e.g., MAE, MSE, cross-entropy) between the inferencing task result 1806 and the ground-truth annotation 1804. In various instances, as shown, the fine-tuning component 120 can incrementally update the trainable internal parameters of the trained deep learning neural network 104, by performing backpropagation (e.g., stochastic gradient descent) driven by the computed error or loss.

In various cases, the fine-tuning component 120 can repeat the above-described training procedure for any suit-able number of images (e.g., for all of the images in the larger, aggregated training dataset). This can ultimately cause the trainable internal parameters of the trained deep learning neural network 104 to become iteratively optimized for accurately performing the inferencing task on inputted images, even if those images exhibit the visual variety/style of the failure image 108. In various aspects, the fine-tuning component 120 can implement any suitable training batch sizes, any suitable training termination criterion, or any suitable error, loss, or objective function when retraining the trained deep learning neural network 104.

The discussion with respect to FIG. 18 can be considered as a non-limiting example of how the trained deep learning neural network 104 can be retrained in supervised fashion. However, as mentioned above, the training dataset 106, and the converted training dataset 1202, can, in various cases, be unannotated (e.g., the set of ground-truth annotations 204 can be unavailable or unknown). In such cases, the fine-tuning component 120 can retrain the trained deep learning neural network 104 on the larger, aggregated training data-set, in unsupervised or reinforcement learning fashion.

Figure 19:
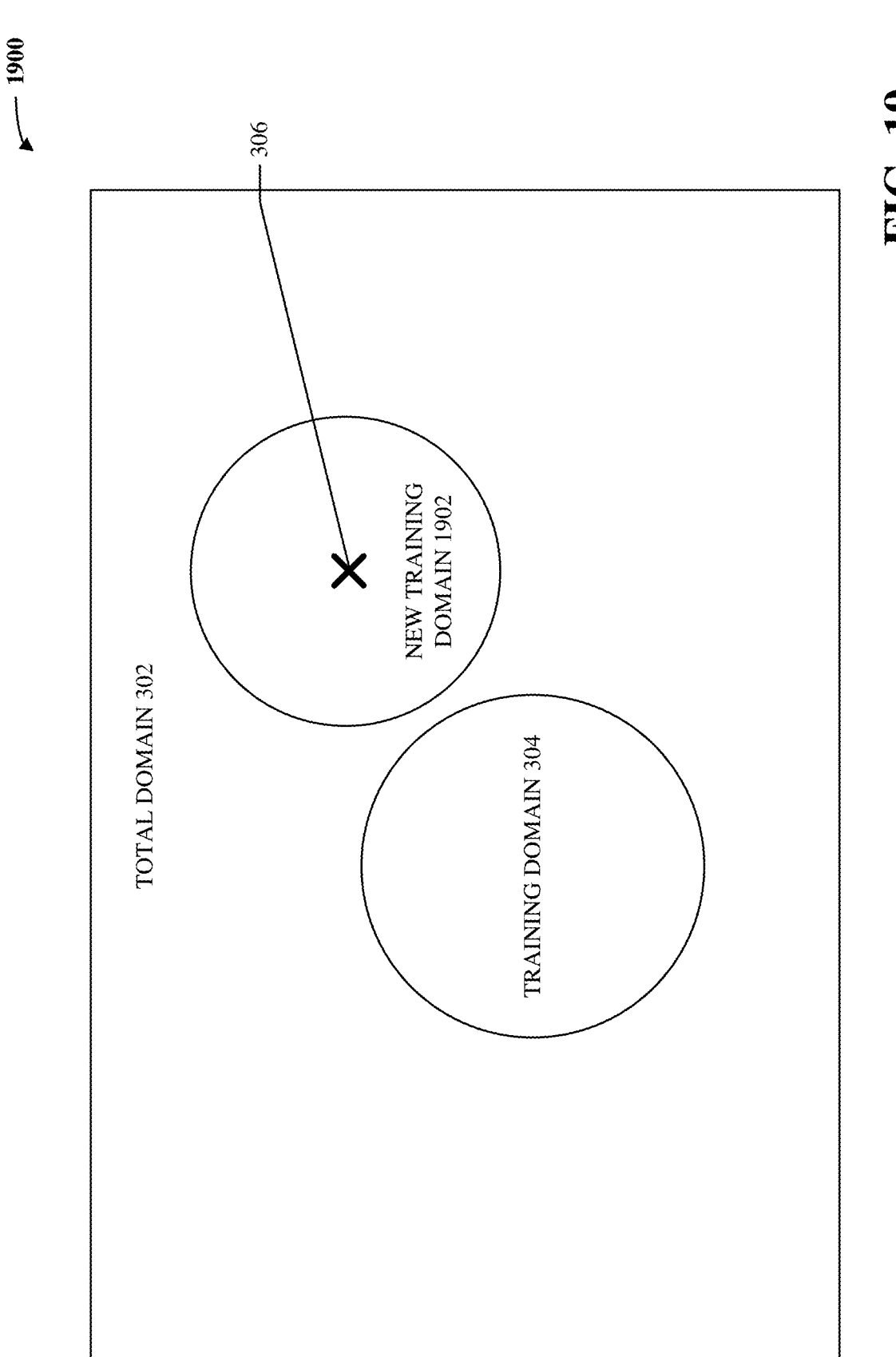
FIGS. 19-20 illustrate example, non-limiting block diagrams conceptually showing how in-scope and out-of-scope deep learning domains can be altered by variety learning in accordance with one or more embodiments described herein.
Figure 20:
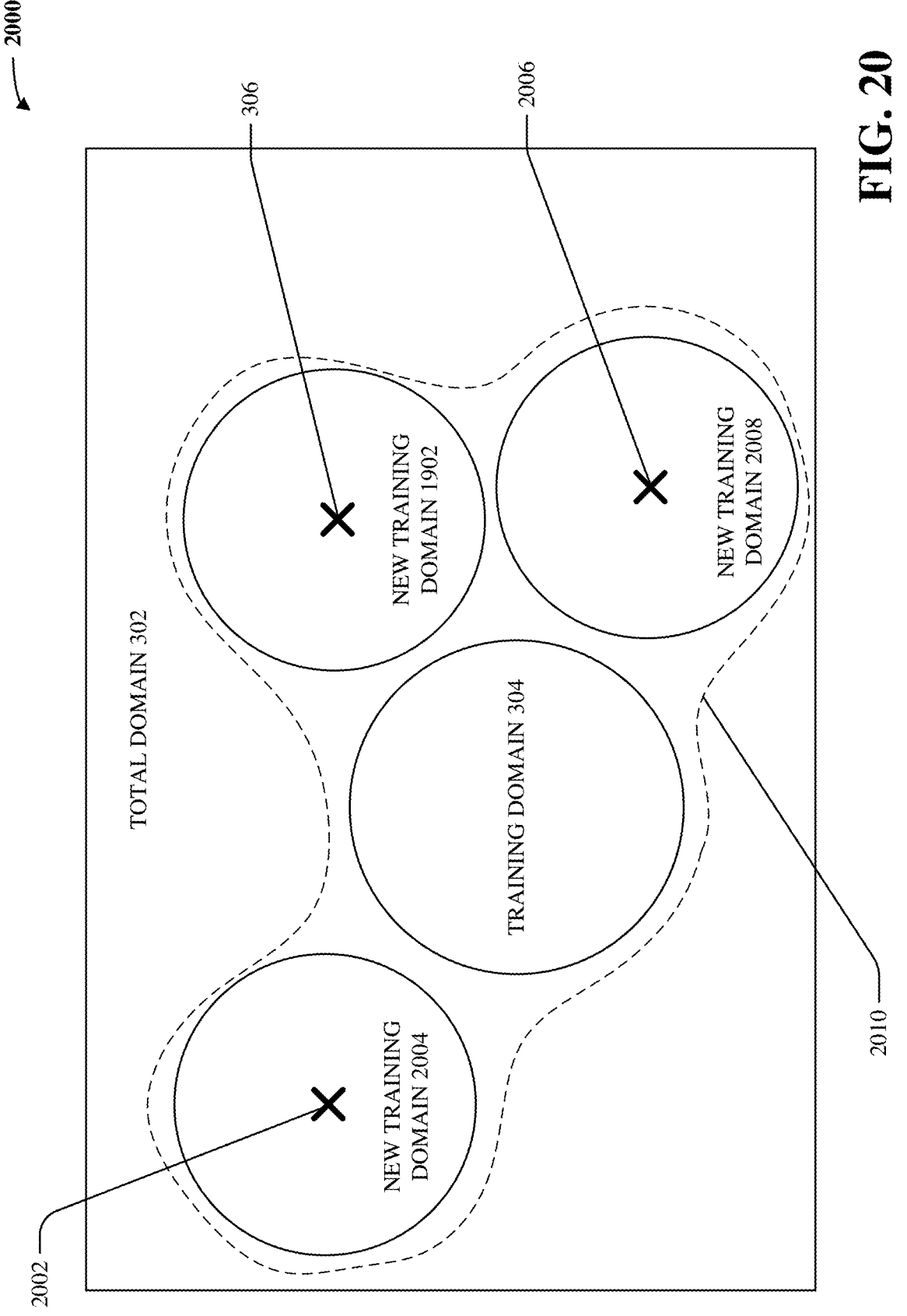

FIGS. 19-20 illustrate example, non-limiting block dia-grams 1900 and 2000 conceptually showing how in-scope and out-of-scope deep learning domains can be altered by variety learning/discovery in accordance with one or more embodiments described herein.

First, consider FIG. 19. As mentioned above, the numeral 302 can be considered as conceptually representing the total domain of visual characteristics that can be exhibited by images, the numeral 304 can be considered as conceptually representing whatever visual characteristics are covered by or included in the training dataset 106, and the numeral 306 can be considered as conceptually representing the failure image 108, which can have an out-of-scope visual charac-teristic (e.g., the visual variety/style of the failure image 108 can be different from those of the set of training images 202).

In various aspects, numeral 1902 can be considered as conceptually representing whatever visual characteristics (e.g., content-style combinations) are covered by or included within the converted training dataset 1202. As shown, the training dataset 106 and the converted training dataset 1202 can be considered as collectively covering a larger propor-tion of the total domain denoted by the numeral 302, than either the training dataset 106 or the converted training dataset 1202 cover alone. Accordingly, by combining the training dataset 106 and the converted training dataset 1202 into a larger, aggregated training dataset and by retraining the trained deep learning neural network 104 on that larger, aggregated training dataset, the fine-tuning component 120 can be considered as making the trained deep learning neural network 104 more robust against (e.g., better able to ana-lyze) a larger proportion of the total domain denoted by the numeral 302.

In various aspects, more than one failure image might be encountered during deployment of the trained deep learning neural network 104, where each of those failure images can be considered as having a unique or distinct visual variety/style against which the trained deep learning neural network 104 is not robust. In such cases, the variety discovery system 102 can treat each of those multiple failure images just like the failure image 108. That is, the visual varieties/styles of those failure images can be learned or discovered (e.g., either all learned/discovered by the variety deep learning neural network 402; or each learned/discovered by a respec-tive, separately-trained instantiation of the variety deep learning neural network 402), and new versions of the training dataset 106 can be created according to those learned/discovered visual varieties/styles. A non-limiting example is shown with respect to FIG. 20.

In various aspects, as mentioned above, the numeral 306 can be considered as conceptually representing the failure image 108, and the numeral 1902 can be considered as conceptually representing the converted training dataset 1202. In various instances, numeral 2002 can be considered as conceptually representing another failure image which has been encountered by the trained deep learning neural network 104. In various cases, the visual variety/style of that another failure image can be learned or discovered as described herein, so as to generate another converted train-ing dataset. In various aspects, numeral 2004 can be con-sidered as conceptually representing that another converted training dataset. Likewise, numeral 2006 can be considered as conceptually representing still another failure image which has been encountered by the trained deep learning neural network 104. In various instances, the visual variety/style of that still another failure image can be learned or discovered as described herein, so as to generate still another converted training dataset. In various cases, numeral 2008 can be considered as conceptually representing that still another converted training dataset.

In any case, as shown by numeral 2010, all of these newly converted training datasets can, along with the training dataset 106, be considered as collectively covering more and more portions of the total domain denoted by the numeral 302. Accordingly, all of such new converted training datasets can be aggregated together with the training dataset 106, and the fine-tuning component 120 can retrain the trained deep learning neural network 104 on such aggregation. This can significantly increase the robustness of the trained deep learning neural network 104.

FIG. 21 illustrates an example, non-limiting table 2100 of experimental results in accordance with one or more embodiments described herein. That is, the present inventors performed various experiments to demonstrate technical benefits of various embodiments described herein, and the table 2100 lists results of those experiments.

In particular, the present inventors reduced to practice three separate versions of a deep learning neural network that was configured to perform an inferencing task on inputted images. A first version of that deep learning neural network was trained only on some original training dataset. That first version was executed on a testing/validation dataset, and its performance metrics (e.g., Dice score distribution, Dice score mean, Dice score standard deviation, Dice score quartiles) are shown in the column of the table 2100 entitled "original training dataset". The present inventors identified some failure image for which the first version of the deep learning neural network produced an incorrect inferencing task result.

Additionally, a second version of that deep learning neural network was trained on the original training dataset and on that failure image (e.g., the present inventors manually crafted a ground-truth annotation for the failure image). That second version was executed on the testing/validation dataset, and its performance metrics are shown in the column of the table 2100 entitled "original training dataset, plus failure image". As shown, the performance metrics slightly improved by including the failure image in the training (e.g., that second version produced a slightly higher proportion of high-magnitude Dice scores than the first version).

Now, the visual variety/style of that failure image was learned/discovered as described herein, a converted version of the original training dataset was generated as described herein based on that learned/discovered visual variety/style, and a third version of that deep learning neural network was trained on both the original training dataset and on the converted version of that training dataset. That third version was executed on the testing/validation dataset, and its performance metrics are shown in the column of the table 2100 entitled "original training dataset, plus converted training dataset exhibiting learned variety of failure image". As shown, the performance metrics significantly improved by incorporating various embodiments described herein (e.g., that third version produced a significantly higher proportion of high-magnitude Dice scores than the second version, a significantly lower proportion of low-magnitude Dice scores than the second version, a significantly higher Dice score mean, a significantly smaller (and thus more stable) Dice score standard deviation, and significantly higher Dice score quartiles).

These experimental results help to demonstrate the real-world performance boost in deep learning inferencing accuracy and robustness that can be achieved by various embodiments described herein.

FIG. 22 illustrates a block diagram of an example, non-limiting computer-implemented method 2200 that can facilitate automatic image variety simulation for improved deep learning performance in accordance with one or more embodiments described herein. In various cases, the variety discovery system 102 can facilitate the computer-implemented method 2200.

In various embodiments, act 2202 can include accessing, by a device (e.g., via 114) operatively coupled to a processor (e.g., 110), a failure image (e.g., 108) on which a first deep learning neural network (e.g., 104) has inaccurately performed an inferencing task.

In various aspects, act 2204 can include training, by the device (e.g., via 116) and on a set of dummy images (e.g., 404), a second deep learning neural network (e.g., 402) to learn a first visual variety of the failure image, based on a loss function (e.g., 406) having a first term (e.g., 408) and a second term (e.g., 410), wherein the first term can quantify visual content dissimilarities between the set of dummy images and outputs predicted during training by the second deep learning neural network, and wherein the second term can quantify, at a plurality of different image scales (e.g., 702), visual variety dissimilarities between the failure image and the outputs predicted during training by the second deep learning neural network.

In various instances, act 2206 can include executing, by the device (e.g., via 118), the second deep learning neural network on each of a set of training images (e.g., 202) on which the first deep learning neural network was trained, thereby yielding a set of first converted training images (e.g., 1302) that exhibit the first visual variety of the failure image.

Although not explicitly shown in FIG. 22, the computer-implemented method 2200 can include verifying, by the device (e.g., via 118), whether or not the second deep learning neural network correctly learned the first visual variety of the failure image, based on executing the first deep learning neural network on one or more (e.g., 1706) of the set of first converted training images.

Although not explicitly shown in FIG. 22, the computer-implemented method 2200 can include retraining, by the device (e.g., via 120), the first deep learning neural network on the set of training images and on the set of first converted training images (e.g., as shown with respect to FIG. 18).

Although not explicitly shown in FIG. 22, for a dummy image (e.g., 602) from the set of dummy images, the training the second deep learning neural network can include: executing, by the device (e.g., via 116), the second deep learning neural network on the dummy image, thereby yielding a predicted output (e.g., 604); computing, by the device (e.g., via 116), the first term of the loss function based on a mean absolute error, a mean squared error, or a cross-entropy error between the predicted output and the dummy image; computing, by the device (e.g., via 116), the second term of the loss function based on, at each of the plurality of different image scales (e.g., 702), one or more respective region-wise Gram matrix differences (e.g., 704) between the predicted output and the failure image; and updating, by the device (e.g., via 116) and via backpropagation, internal parameters of the second deep learning neural network based on the loss function.

Although not explicitly shown in FIG. 22, the set of dummy images can be unrelated to the failure image and to the set of training images. Indeed, in some cases, the failure image and the set of training images can be medical images, and the set of dummy images can be scenic nature images (e.g., as shown with respect to FIGS. 8-11).

Although not explicitly shown in FIG. 22, the computer-implemented method 2200 can comprise: accessing, by the device (e.g., via 114), another failure image (e.g., another instance of 108) on which the first deep learning neural network has inaccurately performed the inferencing task; training, by the device (e.g., via 116) and on the set of dummy images, the second, or a third, deep learning neural network to learn a second visual variety of the another failure image (e.g., 402 can itself be trained to learn multiple varieties/styles, or a separate instantiation of 402 can be trained for each additional variety/style that is desired to be learned), based on another loss function (e.g., another instance of 406) having a third term (e.g., another instance of 408) and a fourth term (e.g., another instance of 410), wherein the third term can quantify visual content dissimilarities between the set of dummy images and outputs predicted during training by the second, or the third, deep learning neural network, and wherein the fourth term can quantify, at the plurality of different image scales (e.g., 702), visual variety dissimilarities between the another failure image and the outputs predicted during training by the second, or the third, deep learning neural network; and executing, by the device (e.g., via 118), the second, or the third, deep learning neural network on each of the set of training images (e.g., 106), thereby yielding a set of second converted training images (e.g., another instance of 1302) that exhibit the second visual variety of the another failure image.

Although not explicitly shown in FIG. 22, the computer-implemented method 2200 can include retraining, by the device (e.g., via 120), the first deep learning neural network on the set of training images (e.g., 202), on the set of first converted training images (e.g., 1302), and on the set of second converted training images (e.g., another instance of 1302).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=$confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 23:
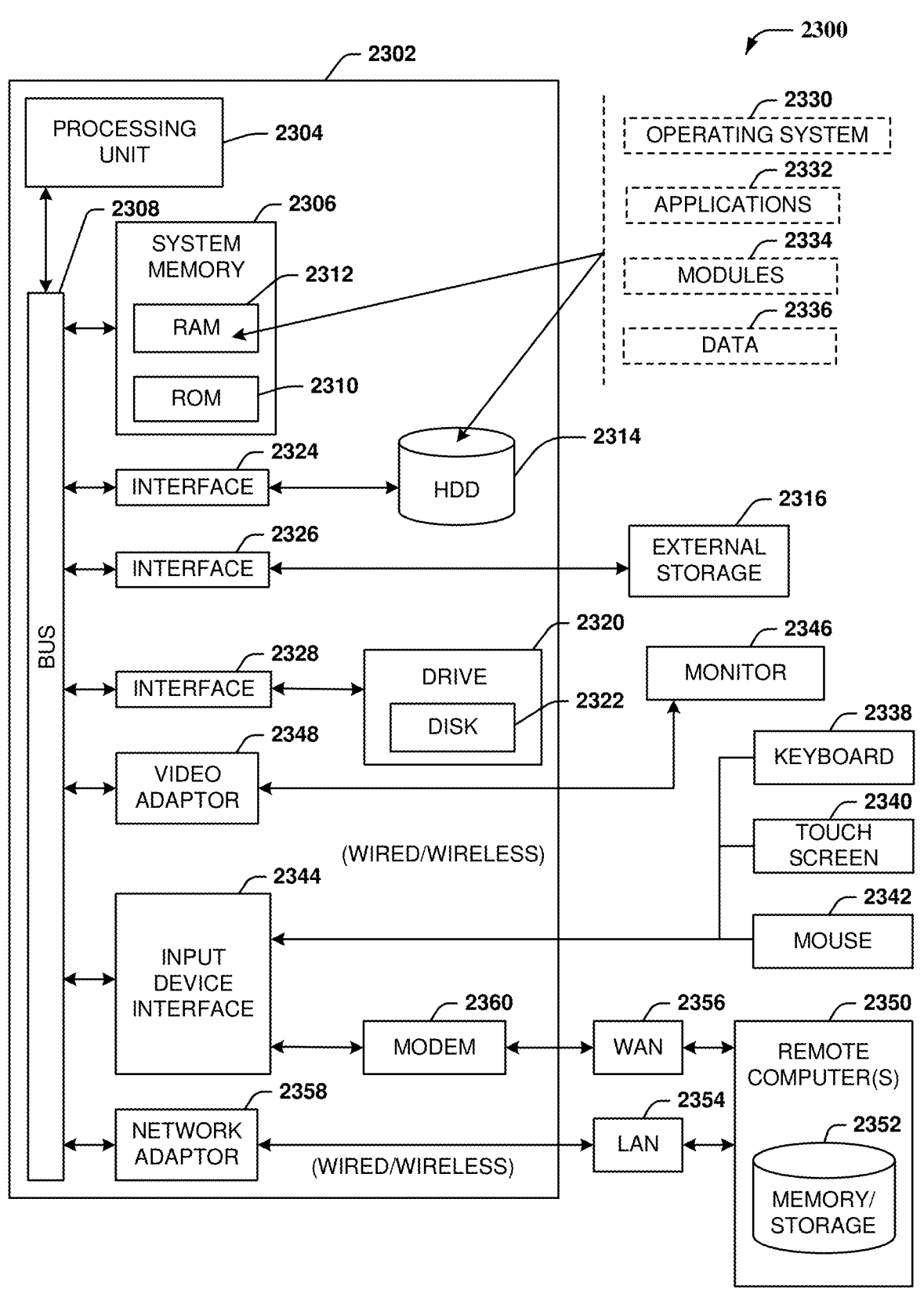
FIG. 23 illustrates a block diagram of an example, non-limiting operating environment in which one or more embodiments described herein can be facilitated.

In order to provide additional context for various embodiments described herein, FIG. 23 and the following discussion are intended to provide a brief, general description of a suitable computing environment 2300 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and a drive 2320, e.g., such as a solid state drive, an optical disk drive, which can read or write from a disk 2322, such as a CD-ROM disc, a DVD, a BD, etc. Alternatively, where a solid state drive is involved, disk 2322 would not be included, unless separate. While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and drive 2320 can be connected to the system bus 2308 by an HDD interface 2324, an external storage interface 2326 and a drive interface 2328, respectively. The interface 2324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for applications 2332. Runtime environments are consistent execution environments that allow applications 2332 to run on any operating system that includes the runtime environment. Similarly, operating system 2330 can support containers, and applications 2332 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2346 or other type of display device can be also connected to the system bus 2308 via an interface, such as a video adapter 2348. In addition to the monitor 2346, a computer typically includes other peripheral output devices (not shown), such as speakers, printers, etc.

The computer 2302 can operate in a networked environment using logical connections via wired or wireless communications to one or more remote computers, such as a remote computer(s) 2350. The remote computer(s) 2350 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2352 is illustrated. The logical connections depicted include wired/wireless connectivity to a local area network (LAN) 2354 or larger networks, e.g., a wide area network (WAN) 2356. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2354 through a wired or wireless communication network interface or adapter 2358. The adapter 2358 can facilitate wired or wireless communication to the LAN 2354, which can also include a wireless access point (AP) disposed thereon for communicating with the adapter 2358 in a wireless mode.

When used in a WAN networking environment, the computer 2302 can include a modem 2360 or can be connected to a communications server on the WAN 2356 via other means for establishing communications over the WAN 2356, such as by way of the Internet. The modem 2360, which can be internal or external and a wired or wireless device, can be connected to the system bus 2308 via the input device interface 2344. In a networked environment, program modules depicted relative to the computer 2302 or portions thereof, can be stored in the remote memory/storage device 2352. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above, such as but not limited to a network virtual machine providing one or more aspects of storage or processing of information. Generally, a connection between the computer 2302 and a cloud storage system can be established over a LAN 2354 or WAN 2356 e.g., by the adapter 2358 or modem 2360, respectively. Upon connecting the computer 2302 to an associated cloud storage system, the external storage interface 2326 can, with the aid of the adapter 2358 or modem 2360, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 24:
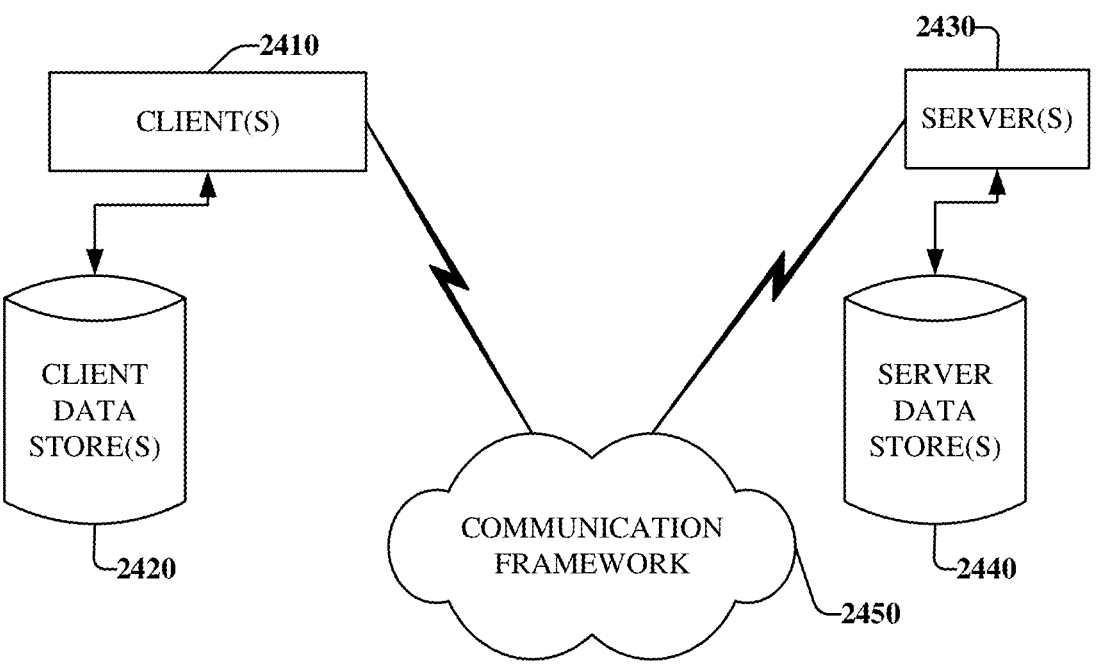
FIG. 24 illustrates an example networking environment operable to execute various implementations described herein.

FIG. 24 is a schematic block diagram of a sample computing environment 2400 with which the disclosed subject matter can interact. The sample computing environment 2400 includes one or more client(s) 2410. The client(s) 2410 can be hardware or software (e.g., threads, processes, computing devices). The sample computing environment 2400 also includes one or more server(s) 2430. The server(s) 2430 can also be hardware or software (e.g., threads, processes, computing devices). The servers 2430 can house threads to perform transformations by employing one or more embodiments as described herein, for example. One possible communication between a client 2410 and a server 2430 can be in the form of a data packet adapted to be transmitted between two or more computer processes. The sample computing environment 2400 includes a communication framework 2450 that can be employed to facilitate communications between the client(s) 2410 and the server(s) 2430. The client(s) 2410 are operably connected to one or more client data store(s) 2420 that can be employed to store information local to the client(s) 2410. Similarly, the server(s) 2430 are operably connected to one or more server data store(s) 2440 that can be employed to store information local to the servers 2430.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, singlecore processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a non-transitory computer-readable memory, wherein the computer-executable components comprise:

an access component that accesses a failure image on which a first deep learning neural network has inaccurately performed an inferencing task;

a variety component that trains, on a set of dummy images, a second deep learning neural network to learn a first visual variety of the failure image, based on a loss function having a first term and a second term, wherein the first term quantifies visual content dissimilarities between the set of dummy images and outputs predicted during training by the second deep learning neural network, and wherein the second term quantifies, at a plurality of different image scales, visual variety dissimilarities between the failure image and the outputs predicted during training by the second deep learning neural network; and a conversion component that executes the second deep learning neural network on each of a set of training images on which the first deep learning neural network was trained, thereby yielding a set of first converted training images that exhibit the first visual variety of the failure image.

2. The system of claim 1, wherein the conversion component verifies whether or not the second deep learning neural network correctly learned the first visual variety of the failure image, based on executing the first deep learning neural network on one or more of the set of first converted training images.

3. The system of claim 1, wherein the computer-executable components further comprise:

a fine-tuning component that retrains the first deep learning neural network on the set of training images and on the set of first converted training images.

4. The system of claim 1, wherein, for a dummy image from the set of dummy images, the variety component:

executes the second deep learning neural network on the dummy image, thereby yielding a predicted output;

computes the first term of the loss function based on a mean absolute error, a mean squared error, or a cross-entropy error between the predicted output and the dummy image;

computes the second term of the loss function based on, at each of the plurality of different image scales, one or more respective region-wise Gram matrix differences between the predicted output and the failure image; and updates, via backpropagation, internal parameters of the second deep learning neural network based on the loss function.

5. The system of claim 1, wherein the set of dummy images are unrelated to the failure image and to the set of training images.

6. The system of claim 5, wherein the failure image and the set of training images are medical images, and wherein the set of dummy images are scenic nature images.

7. The system of claim 1, wherein:

the access component accesses another failure image on which the first deep learning neural network has inaccurately performed the inferencing task;

the variety component trains, on the set of dummy images, the second, or a third, deep learning neural network to learn a second visual variety of the another failure image, based on another loss function having a third term and a fourth term, wherein the third term quantifies visual content dissimilarities between the set of dummy images and outputs predicted during training by the second, or the third, deep learning neural network, and wherein the fourth term quantifies, at the plurality of different image scales, visual variety dissimilarities between the another failure image and the outputs predicted during training by the second, or the third, deep learning neural network; and the conversion component executes the second, or the third, deep learning neural network on each of the set of training images, thereby yielding a set of second converted training images that exhibit the second visual variety of the another failure image.

8. The system of claim 7, wherein the computer-executable components further comprise:

a fine-tuning component that retrains the first deep learning neural network on the set of training images, on the set of first converted training images, and on the set of second converted training images.

9. A computer-implemented method, comprising:

accessing, by a device operatively coupled to a processor, a failure image on which a first deep learning neural network has inaccurately performed an inferencing task;

training, by the device and on a set of dummy images, a second deep learning neural network to learn a first visual variety of the failure image, based on a loss function having a first term and a second term, wherein the first term quantifies visual content dissimilarities between the set of dummy images and outputs predicted during training by the second deep learning neural network, and wherein the second term quantifies, at a plurality of different image scales, visual variety dissimilarities between the failure image and the outputs predicted during training by the second deep learning neural network; and executing, by the device, the second deep learning neural network on each of a set of training images on which the first deep learning neural network was trained, thereby yielding a set of first converted training images that exhibit the first visual variety of the failure image.

10. The computer-implemented method of claim 9, further comprising:

verifying, by the device, whether or not the second deep learning neural network correctly learned the first visual variety of the failure image, based on executing the first deep learning neural network on one or more of the set of first converted training images.

11. The computer-implemented method of claim 9, further comprising:

retraining, by the device, the first deep learning neural network on the set of training images and on the set of first converted training images.

12. The computer-implemented method of claim 9, wherein, for a dummy image from the set of dummy images, the training the second deep learning neural network comprises:

executing, by the device, the second deep learning neural network on the dummy image, thereby yielding a predicted output;

computing, by the device, the first term of the loss function based on a mean absolute error, a mean squared error, or a cross-entropy error between the predicted output and the dummy image;

computing, by the device, the second term of the loss function based on, at each of the plurality of different image scales, one or more respective region-wise Gram matrix differences between the predicted output and the failure image; and updating, by the device and via backpropagation, internal parameters of the second deep learning neural network based on the loss function.

13. The computer-implemented method of claim 9, wherein the set of dummy images are unrelated to the failure image and to the set of training images.

14. The computer-implemented method of claim 13, wherein the failure image and the set of training images are medical images, and wherein the set of dummy images are scenic nature images.

15. The computer-implemented method of claim 9, further comprising:

accessing, by the device, another failure image on which the first deep learning neural network has inaccurately performed the inferencing task;

training, by the device and on the set of dummy images, the second, or a third, deep learning neural network to learn a second visual variety of the another failure image, based on another loss function having a third term and a fourth term, wherein the third term quantifies visual content dissimilarities between the set of dummy images and outputs predicted during training by the second, or the third, deep learning neural network, and wherein the fourth term quantifies, at the plurality of different image scales, visual variety dissimilarities between the another failure image and the outputs predicted during training by the second, or the third, deep learning neural network; and executing, by the device, the second, or the third, deep learning neural network on each of the set of training images, thereby yielding a set of second converted training images that exhibit the second visual variety of the another failure image.

16. The computer-implemented method of claim 15, further comprising:

retraining, by the device, the first deep learning neural network on the set of training images, on the set of first converted training images, and on the set of second converted training images.

17. A computer program product for facilitating automatic image variety simulation for improved deep learning performance, the computer program product comprising a non-transitory computer-readable memory having program instructions embodied therewith, the program instructions executable by a processor to cause the processor to:

access a failure medical image on which a first deep learning neural network has generated an inaccurate inferencing task result;

train, on a set of non-medical images, a second deep learning neural network to learn a visual variety of the failure medical image, based on a loss function having a first term and a second term, wherein the first term quantifies visual content dissimilarities between the set of non-medical images and outputs predicted during training by the second deep learning neural network, and wherein the second term quantifies, at a plurality of different image scales, visual variety dissimilarities between the failure medical image and the outputs predicted during training by the second deep learning neural network; and execute the second deep learning neural network on each of a set of training medical images on which the first deep learning neural network was trained, thereby yielding a set of converted training medical images that exhibit the visual variety of the failure medical image.

18. The computer program product of claim 17, wherein the program instructions are further executable to cause the processor to:

retrain the first deep learning neural network on the set of training medical images and on the set of converted training medical images.

19. The computer program product of claim 17, wherein, for a non-medical image from the set of non-medical images, the processor:

executes the second deep learning neural network on the non-medical image, thereby yielding a predicted output;

computes the first term of the loss function based on a mean absolute error, a mean squared error, or a cross-entropy error between the predicted output and the non-medical image;

computes the second term of the loss function based on, at each of the plurality of different image scales, one or more respective region-wise Gram matrix differences between the predicted output and the failure medical image; and updates, via backpropagation, internal parameters of the second deep learning neural network based on the loss function.

20. The computer program product of claim 17, wherein the set of non-medical images are scenic nature images.

\* \* \* \* \*